US008695430B1

(12) United States Patent
Eldridge et al.

(10) Patent No.: US 8,695,430 B1
(45) Date of Patent: Apr. 15, 2014

(54) TEMPERATURE AND PRESSURE SENSORS BASED ON SPIN-ALLOWED BROADBAND LUMINESCENCE OF DOPED ORTHORHOMBIC PEROVSKITE STRUCTURES

(75) Inventors: Jeffrey I. Eldridge, Rocky River, OH (US); Matthew D. Chambers, Goleta, CA (US)

(73) Assignee: The United States of America as Represented by the Administrator of National Aeronautics and Space Administration, Washington, DC (US)

(*) Notice: Subject to any disclaimer, the term of this patent is extended or adjusted under 35 U.S.C. 154(b) by 324 days.

(21) Appl. No.: 13/303,292

(22) Filed: Nov. 23, 2011

(51) Int. Cl.
*G01L 7/00* (2006.01)
*G01L 9/00* (2006.01)

(52) U.S. Cl.
USPC .................................. 73/705; 73/700

(58) Field of Classification Search
None
See application file for complete search history.

(56) References Cited

U.S. PATENT DOCUMENTS

| 3,550,033 | A | | 12/1970 | Ohlmann et at. |
| 4,075,493 | A | | 2/1978 | Wickersheim |
| 4,215,275 | A | | 7/1980 | Wickersheim |
| 4,246,630 | A | * | 1/1981 | Wolfe .......................... 362/260 |
| 4,542,987 | A | | 9/1985 | Hirschfeld et al. |
| 4,648,094 | A | | 3/1987 | McCollum et al. |
| 4,708,494 | A | | 11/1987 | Kleinerman |
| 4,768,886 | A | | 9/1988 | Hirschfeld et al. |
| 4,776,827 | A | | 10/1988 | Greaves |
| 4,944,833 | A | | 7/1990 | Belt et al. |
| 4,954,211 | A | | 9/1990 | Belt et al. |
| 4,962,087 | A | | 10/1990 | Belt et al. |
| 4,970,060 | A | | 11/1990 | Belt et al. |
| 5,107,445 | A | | 4/1992 | Jensen et al. |
| 5,140,609 | A | | 8/1992 | Jensen et al. |
| 5,211,480 | A | | 5/1993 | Thomas et al. |
| 5,255,980 | A | | 10/1993 | Thomas et al. |
| 5,351,268 | A | | 9/1994 | Jensen et al. |
| 5,601,661 | A | | 2/1997 | Milstein et al. |
| 5,663,556 | A | | 9/1997 | Wessels et al. |
| 7,053,554 | B2 | * | 5/2006 | Yasuda et al. .................. 313/634 |
| 7,230,127 | B2 | * | 6/2007 | Sage et al. ...................... 556/14 |
| 7,242,443 | B2 | * | 7/2007 | Sage et al. ...................... 349/56 |
| 8,114,509 | B2 | * | 2/2012 | Spichiger-Keller et al. .......................... 428/312.2 |
| 2007/0171958 | A1 | | 7/2007 | Hoang et al. |
| 2009/0122832 | A1 | | 5/2009 | Feist et al. |

OTHER PUBLICATIONS

H. Uchiyama, H. Aizawa, T. Katsumata, S. Komuro, and T. Morikawa, Fiber-optic Thermometer Using Cr-doped YAlO3 Sensor Head, American Institute of Physics (Aug. 2003) Review of Scientific Instruments vol. 74, No. 8, p. 3883.
B.R. Jovanic and J. P. Andreeta, GdAlO3:Cr3+ as a New Pressure Sensor, IOPSCIENCE Physica Scripta vol. 59, pp. 274-276 (1999).

* cited by examiner

*Primary Examiner* — Lisa Caputo
*Assistant Examiner* — Jermaine Jenkins
(74) *Attorney, Agent, or Firm* — Robert H. Earp, III

(57) ABSTRACT

Systems and methods that are capable of measuring pressure or temperature based on luminescence are discussed herein. These systems and methods are based on spin-allowed broadband luminescence of sensors with orthorhombic perovskite structures of rare earth aluminates doped with chromium or similar transition metals, such as chromium-doped gadolinium aluminate. Luminescence from these sensors can be measured to determine at least one of temperature or pressure, based on either the intense luminescence of these sensors, even at high temperatures, or low temperature techniques discussed herein.

20 Claims, 15 Drawing Sheets

ND STRUCTURES

ORIGIN OF THE INVENTION

The invention described herein was made by an employee of the United States Government and may be manufactured and used by or for the Government for Government purposes without the payment of any royalties thereon or therefore.

BACKGROUND

Optical temperature sensing is crucial to many applications, especially where other methods of temperature sensing are unsuited. There is a long history of optical temperature sensing by measuring thermal radiation output (i.e., pyrometry) that offers the same advantages of being a non-contact, non-electrical measurement that are common to all optical measurements. However, the accuracy of pyrometer measurements is limited by the degree to which the emissivity of the observed object is known, a value which is often uncertain or non-trivially temperature-dependent. Additionally, as any intensity-based measurement, it is perturbed by many system and environment instabilities (an important one of which is an inhomogeneous or flame atmosphere). Luminescence-based temperature sensing, when decay time rather than intensity is used for temperature indication, was developed to overcome these issues and to this purpose has been successful, although with much lower upper temperature limits than pyrometry. In some cases, luminescence temperature sensing has been combined with pyrometry to create a high precision low-temperature sensing system based on luminescence measurements with extended capability (though with less precision) at high temperatures using pyrometry.

Effective lower temperature (below 600° C.) sensing based on oxides or fluorides doped with transition metals (particularly $Cr^{3+}$-based oxides like ruby, alexandrite, and emerald) have been utilized for the high luminescence intensity associated with the strong 3d to 3d absorption and emission transitions. Doping levels as small as 0.01% $Cr^{3+}$ are more than sufficient to provide measurable luminescence at room temperature. In addition, due to the broadness of absorption bands in these materials, a wide variety of excitation sources can be used to excite luminescence.

Higher temperature luminescence decay sensors (some going as high as 1700° C.) have been made based on trivalent rare earth ions such as $Eu^{3+}$, $Dy^{3+}$, $Tb^{3+}$ and $Tm^{3+}$. In these ions, the luminescence is associated with energy transitions of the 4f electrons, whose shielding by the 5s and 5p electrons prevents the energy level broadening (by phonon coupling) observed in the transition metals. This leads to the advantage of suppressed non-radiative transitions, and thermal quenching is delayed to typically much higher temperatures; however, this brings the disadvantage of inherently weaker luminescence by several orders of magnitude due to weaker absorption and emission probabilities. The use of higher doping levels can compensate for the weaker luminescence to some degree; however, luminescence intensity reaches a maximum typically at a few cation percent before falling off due to concentration quenching. The low emission intensity from rare earth dopants, especially in the presence of intense background thermal radiation, has been a severe impediment for successful high temperature application.

The key difficulty encountered by the current state of the art is achieving temperature sensing capability and in maintaining temperature measurement precision to high temperatures. As temperature increases, non-radiative de-excitation processes increasingly compete with the radiative transition of the lumiphore, causing a quenching, or loss, of signal intensity at the same time that the blackbody background radiation increases. For all lumiphores, there is a temperature at which luminescent intensity is no longer adequate to reliably measure temperature. In addition, the luminescence decay time which is used to correlate to temperature decreases exponentially with temperature after the onset of quenching; this leads, on one hand, to the requisite temperature sensitivity but also results in a secondary upper limit to temperature sensing capability at which point the decay time is too short to be measured without convolution from the excitation or detection apparatus. As such, conventional non-contact, luminescence-based optical temperature sensors lack intensity and decay time properties sufficient to be used in many high temperature applications.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a luminescence-based sensor system. This system can include a chromium-doped gadolinium aluminate ($Cr:GdAlO_3$) sensor, or a sensor made of similar materials discussed herein. Additionally, such a system can include a measurement component capable of receiving luminescence illumination from the $Cr:GdAlO_3$ or other similar sensor and measuring intensity data associated with the luminescence illumination. Further, the system can include an analysis component that can determine at least one of a temperature or a pressure based at least in part on the measured intensity data. In addition, the measurement component can utilize decay time of spin-allowed broadband luminescence for at least the upper temperature range of temperature and/or pressure sensing.

In other aspects, the innovation can comprise a method of measuring based on luminescence. Such a method can include the act of exciting a luminescent material with a pulsed light source. In aspects, the luminescent material can be a sensor comprising an orthorhombic perovskite structure of a rare earth aluminate doped with chromium ($Cr:REAlO_3$, where RE=one of the rare earth elements Gd, Tb, Dy, Y, Ho, Er, or Tm). Additionally, the method can include the act of collecting luminescence from the $Cr:REAlO_3$ sensor. The method can also include the act of determining at least one of a temperature or a pressure of the $Cr:REAlO_3$ sensor based at least in part on the collected luminescence of the $Cr:REAlO_3$ sensor.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
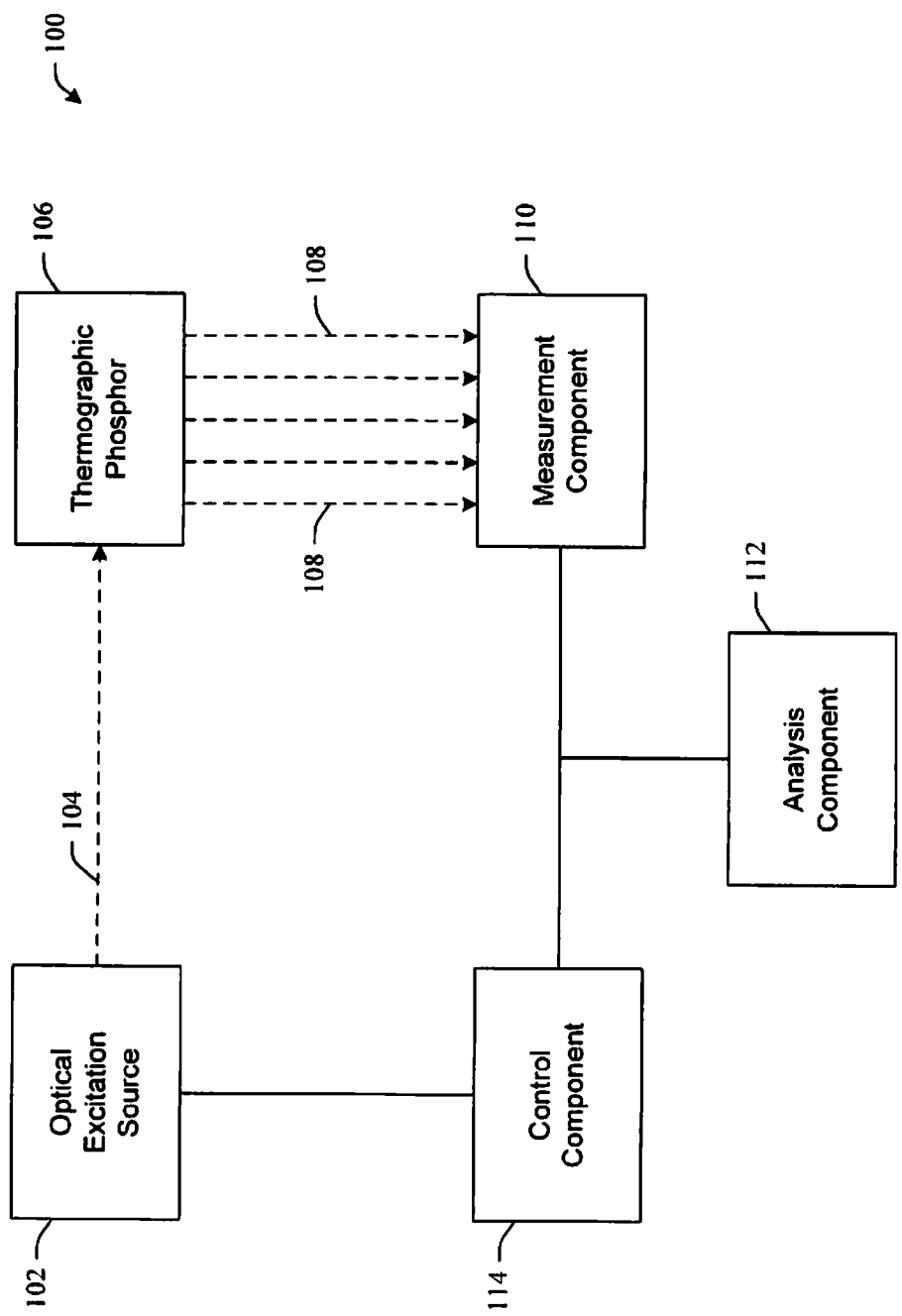
FIG. 1 shows a system capable of optical measurement of at least one of temperature or pressure in accordance with aspects of the subject innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

The subject innovation provides a high-temperature luminescence-based temperature sensor that both shows high temperature sensitivity in the upper temperature range of present state-of-the-art luminescence sensors (to at least 1300° C.) while maintaining substantially stronger luminescence signal intensity that will allow optical sensors according to the subject innovation to operate in the presence of the high thermal background radiation typical of industrial applications. The subject innovation can provide this by using a sensor comprising chromium-doped gadolinium aluminate, Cr:GdAlO$_3$, or another orthorhombic perovskite rare earth aluminate doped with any transition metal ion with an nd$^3$ electron configuration where n=3, 4 or 5 such as Cr$^{3+}$, V$^{2+}$, Mn$^{4+}$, Mo$^{3+}$, or Re$^{4+}$, resulting in spin-allowed broadband luminescence that remains strong at high temperature due to the favorable electron energy level spacing of the material (e.g., Cr:GdAlO$_3$). As used herein, broadband luminescence emission is defined as radiative emission due to a spin-allowed transition between electronic states with a significant Franck-Condon offset, $\Delta_{FC}$, that produces a strongly phonon-coupled (and therefore broadened) radiative transition.

Systems and methods of optical temperature measurement according to the subject innovation can be utilized for applications where electrical-based measurements, such as by thermocouple, are unsuitable, due to such factors as harsh environments, RF interference, moving parts, etc., as can be encountered in industrial environments, turbine propulsion engines, electrical turbine generators, etc. Additionally, systems and methods of the subject innovation can be utilized in making pressure measurements or combined temperature/pressure measurements at high temperatures.

Various systems and methods of the subject innovation include use of an orthorhombic perovskite structure of a rare earth aluminate doped with a transition metal (e.g., Cr:GdAlO$_3$, etc.) as a high temperature optical sensor using spin-allowed broadband luminescence. Sensor materials discussed herein (e.g., Cr:GdAlO$_3$, etc.) can be used as temperature sensors, as pressure sensors, or, in some embodiments, as dual pressure/temperature sensors. Some advantages of the orthorhombic perovskite (e.g., GdAlO$_3$, etc.) host are its high crystal field, phase stability, and distorted symmetry at the dopant (e.g., Cr$^{3+}$) occupation sites. The use of the spin-allowed broadband emission for temperature sensing at high temperatures disclosed herein is unanticipated since the broadband emission from the $^4T_2$ to $^4A_2$ electron configuration transition normally shows severe thermal quenching. The tightly bound AlO$_6$ octahedra in the host materials discussed herein (e.g., GdAlO$_3$) results in a larger energy barrier to nonradiative decays at the Al$^{3+}$ octahedral sites where Cr$^{3+}$ (or alternatively Mn$^{4+}$ or V$^{2+}$) substitutes than in other materials and therefore makes using spin-allowed broadband emission for temperature sensing possible at high temperatures. In some embodiments, the addition of a trivalent rare earth dopant to the orthorhombic structure of the transition doped rare earth aluminates discussed herein (e.g., Cr:GdAlO$_3$, etc.) provides a single optical sensor that can measure temperature and pressure independently in complex systems.

The increase in temperature capability of systems and methods of the subject innovation represents a significant advance over conventional systems. Experimental observations described further herein demonstrate usable luminescence decay from an example sensor in accordance with aspects of the innovation, composed of Cr:GdAlO$_3$, to a least 1300° C., whereas in other Cr-doped crystals (for example, ruby), R-line luminescence used for temperature sensing has only been demonstrated up to about 600° C. Furthermore, prior practice has been limited to utilizing R-line decay for Cr-doped crystals, whereas a unique feature of the testing method described herein is the utilization of spin-allowed broadband ($^4T_2$ to $^4A_2$) luminescence that, for the materials described herein, exhibits suppressed thermal quenching and therefore greatly increases the upper temperature limit achievable for temperature sensing. In addition, the relative position of the $^4T_2$ level above the $^2E$ level in Cr:GdAlO$_3$ insures maintaining significant $^2E$ population at elevated temperatures, where this $^2E$ population acts as a reservoir to replenish the more quickly depleting $^4T_2$ population so that the spin-allowed broadband emission ($^4T_2$ to $^4A_2$) will have a much longer decay time than usually observed for a spin-allowed broadband emission due to the constant repopulation of the $^4T_2$ level from the $^2E$ level that occurs in order to maintain thermal equilibrium. Prior to the innovation disclosed herein, the quenching of $Cr^{3+}$ luminescence intensity was previously thought to be preclude application to sensing temperatures above 600° C. due to thermal quenching processes. The materials discussed herein provide advantages via the high crystal field present in the orthorhombic perovskite host materials (e.g., $GdAlO_3$, etc.) and the effect this high crystal field has on suppressing quenching at high temperatures. In addition, these materials (e.g., $GdAlO_3$, etc.) are non-reactive and stable in harsh, high-temperature environments and so can be used at the end of a fiber optic probe (e.g., of silica, sapphire, etc.), as a stand-alone sensor for remote measurements in these environments, or as a dust or powder introduced into a flame or a fluid (e.g., liquid, gas, plasma, or mixed phase materials, such as sprays, colloids, etc.), or as a permanent coating on a surface of interest, or as an incorporated sub-surface layer in a suitably translucent or transparent material to determine a temperature. The many orders of magnitude greater high temperature luminescence intensity from the materials discussed herein (e.g., Cr-doped $GdAlO_3$, etc.) compared to ruby provide a great advantage over the much weaker luminescence from trivalent rare-earth luminescence that is currently used for higher temperature luminescence-based temperature measurements and will allow these materials (e.g., Cr-doped $GdAlO_3$, etc.) to be utilized in the presence of significant background radiation that often occurs in industrial environments.

Turning to FIG. 1, shown is a system 100 capable of optical measurement of at least one of temperature or pressure in accordance with aspects of the subject innovation. System 100 can comprise an optical excitation source 102 that can produce excitation illumination 104 capable of exciting luminescence in a thermographic phosphor 106 of the subject innovation. In some embodiments, optical excitation source 102 can be a laser, although laser diodes, light emitting diodes (LEDs) or other sources (e.g., filament and arc lamps, flashtubes, flames, particle beams such as electron, neutron, or ion beams, etc.) can also be used. Additionally, in some aspects, multiple lasers, LEDs, etc. can be used, for example when temperature measurements are desired for multiple surfaces or sub-surface layers of a component, etc. Optical excitation source 102 can provide pulsed illumination for repeated excitation and thus repeated measurement of thermographic phosphor 106, and the pulse length and frequency can be selected based on requirements such as properties of thermographic phosphor 106, power requirements, etc. Alternatively to pulsed illumination, other techniques may be used, such as amplitude modulation of the excitation illumination 104 and temperature or pressure determinations based on phase shift, etc. Thermographic phosphor 106 can be any of the materials discussed herein, such as $Cr:GdAlO_3$, or other orthorhombic perovskite rare earth aluminates doped with chromium or other isoelectronic transition metal ions. Additionally, throughout this disclosure, although frequent reference is made to $Cr:GdAlO_3$ or other orthorhombic perovskite rare earth aluminates doped with chromium or another similar transition metal, these materials may additionally be doped with a different rare earth element than that of the host material (e.g., $RE,Cr:GdAlO_3$ where RE is a different rare earth element than Gd, etc.). As such, it is to be understood that embodiments additionally doped with a different rare earth element than that of the host material are to be encompassed as alternatives even when not explicitly referenced by language such as materials, thermographic phosphor, rare earth aluminates doped with chromium or another isoelectronic transition metal ions, or other similar terminology or phrases. Embodiments additionally doped with a different rare earth element can perform the temperature or pressure sensing functions of other embodiments, and can also be used as dual pressure/temperature sensors.

Figure 2:
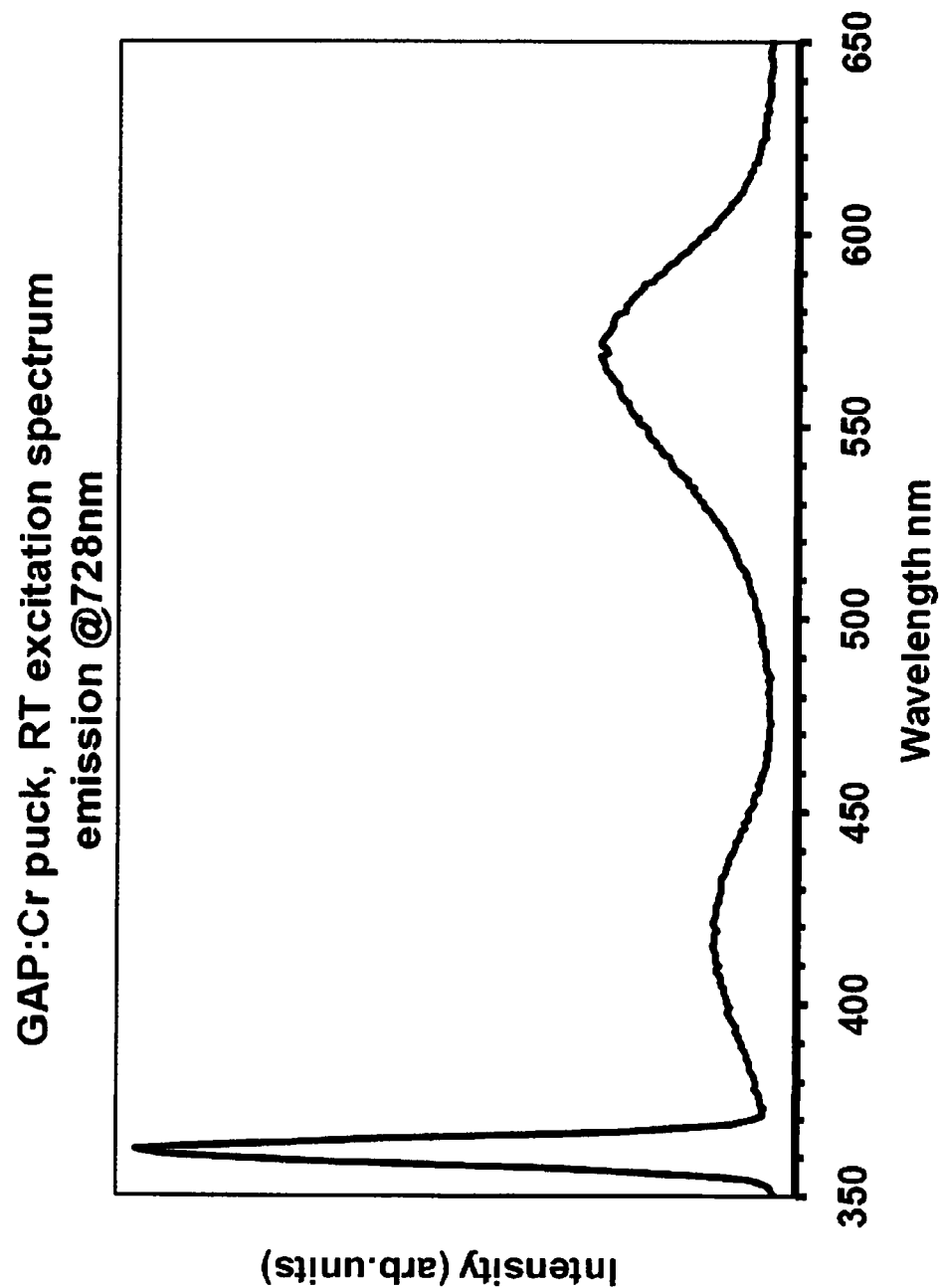
FIG. 2 illustrates the excitation spectrum of Cr:GdAlO$_3$ in accordance with aspects of the subject innovation.

FIG. 2 illustrates the excitation spectrum of one material in accordance with aspects of the subject innovation, that of $Cr:GdAlO_3$, although other materials may be used. As can be seen from FIG. 2, one advantage of $Cr:GdAlO_3$ (and other materials discussed herein) is the wide range of choices for luminescence excitation. As such, excitation illumination 104 can be of any of a number of wavelengths, for example, around 425 nm, around 575 nm, as well as ranges of values around the peaks seen on FIG. 2, etc., allowing for a wide range of lasers or LEDs to be used, or for selection of an excitation wavelength based on environmental or other factors (e.g., if material absorbing one wavelength may be present, others can be used, etc.). For example, any of a range of wavelengths can be used to excite luminescence in materials discussed herein, such as wavelengths ranging from around 350 nm to around 600 nm.

Returning to the discussion of FIG. 1, upon excitation, thermographic phosphor 106 luminesces, outputting emission or luminescent illumination 108. The spectrum of luminescent illumination 108 is temperature dependent, particularly at lower temperatures, as described further herein. In multiple embodiments, such as for high temperature measurement, spin-allowed broadband emission (e.g., from the $^4T_2$ state) can be used for temperature sensing instead of conventional R-line luminescence. In other aspects, however, specific wavelength-dependent features of the spectrum of illumination 108 can be used to determine the temperature, especially at lower temperatures. For example, at lower temperatures, the spectrum of $Cr:GdAlO_3$ has a pronounced zero phonon peak (R-line) and anti-Stokes peak, at about 730 and 700 nm, respectively, which both exhibit distinct temperature dependence. In aspects of the subject innovation, the ratio of the intensities of these peaks can be used for sensitive low-temperature measurement. Similarly, other materials discussed herein can be used for low temperature measurement in corresponding ways. At higher temperatures, the spin-allowed broadband luminescence of the materials discussed herein can be used to determine the temperature as described further herein. In contrast with conventional systems, various materials of the subject innovation exhibit spin-allowed broadband luminescence with intensities well above commonly encountered noise levels at temperatures of up to 1300° C. or higher. In many applications (for example, incorporation into a coating such as a thermal barrier coating (TBC), etc.), the high luminescence intensity of materials discussed herein provide an advantage of high intensity signals allowing measurements to high temperatures even in the presence of high noise or signal attenuation from other sources, such as embedding the material as a buried layer in a coating (e.g., TBC, etc.), incorporating into a component, etc.

The luminescent illumination 108 can be observed by measurement component 110. Measurement component 110 can be a gated photosensitive device, such as a photomultiplier tube, avalanche photodiode, silicon photodiode, intensified charge-coupled device (ICCD), or substantially any other photosensitive device capable of determining the intensity of luminescent illumination with adequate time response in either a spot or imaging mode 108. Optionally, a filter (e.g., a bandpass filter, etc.) can be used that transmits only the desired portion of the spectrum of interest, and can be selected to maximize signal-to-noise, for example by reducing transmission of the thermal radiation background that is most intense at longer wavelengths. Additionally or alternatively, filtering may optionally be used to attenuate the signal received in order to prevent saturation of measurement device 110 by the high intensity of the luminescence. In various embodiments, additional optics may be used with either measurement device 110 or optical excitation source 102 for a variety of reasons as required and as understood in the art, such as to redirect, collimate, filter, focus, split, etc. either excitation illumination 104, luminescent illumination 108, or both. Depending on the configuration of the system, the time resolution that measurement device 110 is capable of may limit the upper temperature range that can be measured by embodiments of the subject innovation. However, time resolutions of less than a nanosecond (e.g., on the order of tens of picoseconds) are available from photosensitive devices known in the art. In aspects, measurement component 110 can obtain global intensity values over time from thermographic phosphor 106 (e.g., in fiber optic embodiments discussed herein, or in certain applications of other embodiments). However, in other aspects, measurement component 110 can also obtain multiple intensity values over time for different regions or portions of thermographic phosphor, so as to determine a map of the intensity, decay time, and temperature (or pressure) of thermographic phosphor 106. For highest spatial resolution, imaging instrumentation is currently available where a decay time can be determined for each individual pixel in the field of view. Depending on the requirements, multiple photosensitive devices can be used to obtain information associated with multiple surfaces of a component or from multiple angles of a region of interest. Due to the high intensity, measurement data can be obtained and analysis performed on it in real-time.

Analysis component 112 can receive intensity data from measurement component 110 and determine temperature (or pressure, or both) based at least in part on the intensity data. First, one or more decay times can be determined that correspond to the intensity data, based on changes in the intensity data over time. For measurements corresponding to more than one region (e.g., different regions subdividing a surface, such as by a grid, etc.), decay times can be determined for each region. For lower temperatures (or pressures, etc.), the temperature (or pressure) can be accurately determined by calculating a ratio of the intensities of a zero phonon and an anti-Stokes peak (or similar features) of the emission spectrum. For higher temperatures, temperatures (or pressures, etc.) can be determined based on the one or more decay times. For example, an exponential decay function can be fit to data captured by measurement component 110 using regression analysis, such as by a least squares algorithm, etc., or other suitable analytical or numerical techniques, and the lifetime value of the function can be compared to a series of calibration values that correlate decay lifetime to temperature (or pressure, etc.) when measured under controlled conditions, which can be determined by calibrating a system of the subject innovation with a reference thermometer (e.g., a thermocouple, platinum resistance thermometer, etc.) to obtain correlations between the series of calibration values that correlate decay lifetime to temperature. Analysis (e.g., curve fitting, etc.) can also include correction for background noise, for example, by background subtraction. Where multiple decay times have been determined corresponding to different regions, temperatures (pressures, etc.) can be determined for each region. Additionally, because of the high intensity luminescence of the materials discussed herein, measurement, analysis, and determination of temperature (or pressure, etc.) can be performed in real time, and can be output in real-time, for example, as a video or image showing a temperature (or pressure, or both) map of a component or region of interest in real-time.

Control component 114 can coordinate the operation of optical excitation source 102, measurement component 110, and analysis component 112. For example, for each pulse of optical excitation source 102, measurement component 110 can obtain intensity data that for processing by analysis component 112. Control component 114 can then present this data in a variety of formats, providing temperature (or pressure, etc.) data over time. In embodiments involving temperature (or pressure, etc.) determinations over multiple regions, this data can be presented as a temperature (or pressure, or both) map, for example, as a video of the temperature (pressure, etc.) map over time.

As described further herein, the decay time of spin-allowed broadband luminescence emission from the orthorhombic perovskite structure of a rare earth aluminate doped with a transition metal ion with $3d^3$ electron configuration (e.g., Cr-doped $GdAlO_3$ ($Cr:GdAlO_3$)) can be used for luminescence sensing of temperature (and pressure) at ultra-high temperatures well above those easily measured by current state of the art luminescence-based temperature (and pressure) sensors. The selection of the orthorhombic perovskite structure (for example, of the $GdAlO_3$ host matrix for the $Cr^{3+}$ lumiphore) and the utilization of the high-temperature spin-allowed broadband luminescence of $Cr:GdAlO_3$ (or other materials discussed herein) can make temperature measurements possible to much higher temperature (up to at least 1300° C., in the case of $Cr:GdAlO_3$) than possible using the commonly used $Cr^{3+}$-doped sapphire (i.e., ruby), for which temperature sensing is limited to below 600° C. The sensor material can be attached to a component (e.g., in an engine, etc.) where it can be remotely probed utilizing excitation and detection optics, attached at the end of a fiber optic probe that can be positioned at a region of interest, or in other settings, such as introducing the material as a dust or powder to characterize a flame (e.g., in connection with an afterburner, the exhaust of a railgun, etc.), or as a permanent coating on a surface of interest, or as an incorporated sub-surface layer in a suitably translucent or transparent material. Since the luminescence of material with an orthorhombic perovskite structure (comprising a rare earth aluminate doped with a $3d^3$ electron configuration transition metal ion (e.g., $Cr:GdAlO_3$)) is also pressure sensitive, in situations involving variations in pressure or stress a rare earth dopant, which luminesces via temperature sensitive but pressure-insensitive 4f-4f electronic transitions, could be added in order to deconvolute the effects of temperature and pressure on the decay time of the rare earth aluminate doped with the transition metal (e.g., $Cr:GdAlO_3$).

In one embodiment, the described temperature (and pressure) sensors (e.g., comprising $Cr:GdAlO_3$) can be incorporated into or applied onto a component's surface (e.g., as part of a coating such as a thermal barrier coating (TBC), in a discrete sensor area, uniformly applied, etc.) when a non-contact surface temperature measurement is desired. In other embodiments, the temperature sensor can be attached to the end of a fiber optic probe (e.g., by physical vapor deposition techniques or painting and curing with a suitable binder, etc.) that can then be positioned at the location where the temperature measurement is desired. In further embodiments, luminescent materials as described herein (e.g., comprising $Cr:GdAlO_3$) can be introduced as a dust or a powder into a flame (e.g., from an afterburner, the exhaust of a railgun, etc.) to characterize the temperature of the flame. Irrespective of the selection among these three categories of embodiments, systems and methods of the subject innovation can be implemented as described herein.

As described herein, in various embodiments, temperature sensors can have alternative configurations, either attached to a fiber optic temperature probe, or incorporated into the component or introduced into a region where temperature measurements are to be taken without the attachment of a physical measurement device. In fiber optic probe embodiments, both the pulsed excitation and the luminescence emission can travel through the fiber optic light guide. Fiber optic splitting and filtering may be useful in preventing scattered laser light from producing fluorescence in the return fiber optic. The emitted light can be carried by the fiber optic to a bandpass filter that can select the portion of the spectrum that contains the broadband emission (or a portion of the emission), then to a detector, for example a photomultiplier tube, ICCD, etc., that measures the intensity observed as a function of time. The output from the detector can be recorded by internal components of measurement component 110, on an oscilloscope, a computer with signal processing software or hardware, etc.

Operation of the temperature sensor incorporated into or applied onto a component (as in thin film, an embedded crystal, a mechanically attached device, or by any other means), or by introducing the material as a dust or powder to characterize a flame can be performed similarly to that of a sensor attached to the end of a fiber optic probe, except that the excitation and emission light travels through free space (instead of only through fiber optic wave guides) for all or a portion of the path of travel, and optics can be used to collimate and focus the excitation and emission light.

In various embodiments, the sensor material can have various geometries, can be produced (e.g., by physical vapor deposition methods, powder sintering or hot-pressing, the Czochralski technique, etc.) as a stand-alone sensor by various ceramic processing methods, or can be produced as a coating on the target component or on the fiber optic tip. Because the 3d to 3d electron transitions are sensitive to pressure and temperature, sensors of the subject innovation (e.g., with an orthorhombic perovskite structure, comprising a rare earth aluminate doped with a $3d^3$ electron configuration transition metal ion (e.g., $Cr:GdAlO_3$)) can be used as a temperature sensor in constant pressure conditions or as a pressure sensor in constant temperature (isothermal) conditions. When both temperature and pressure are expected to vary, a rare earth trivalent dopant such as $Nd^{3+}$, $Eu^{3+}$, $Dy^{3+}$, etc. can be added to deconvolute pressure and temperature effects. Because the luminescence emission from the rare-earth dopants originates from 4f to 4f electron transitions, they are mostly shielded from the effect of pressure. This provides a pressure invariant input that determines the first variable (temperature) after which the second variable (pressure) can be determined from the pressure and temperature variable $Cr^{3+}$ luminescence, at least up to temperatures where the rare-earth luminescence can still be successfully monitored.

For many high-temperature applications, $Cr:GdAlO_3$ will have the best combination of phase stability and intense high temperature spin-allowed broadband luminescence emission of all the Cr-doped rare earth orthoaluminates, but depending on the application, a somewhat more intense signal with a somewhat reduced upper temperature limit may be desired. In such a case, a different Cr-doped rare earth orthoaluminate, for example, $TbAlO_3$, $DyAlO_3$, $YAlO_3$, etc. (all of which have the requisite orthorhombic perovskite structure at high temperatures) may be preferred and all of which will exhibit temperature sensitivity of spin-allowed broadband luminescence decay to higher temperatures than ruby, the current luminescence thermometry standard among transition metal doped thermographic phosphors. Similarly, the $Cr^{3+}$ dopant ion can be replaced by isoelectronic $3d^3$ transition metal ions such as $Mn^{4+}$ and $V^{2+}$ and still exhibit a similarly desirable temperature-sensitive spin-allowed broadband luminescence decay as long as there is charge compensation to offset the non-isovalent substitution of $Mn^{4+}$ or $V^{2+}$ for the $Al^{3+}$ ions in the perovskite structure.

Thermal quenching occurs in all luminescent materials, which can cause a decrease of the luminescence signal as temperature increases further, as described further herein. The utility of conventional spin-allowed broadband luminescence is typically inhibited by severe thermal quenching at substantially lower temperatures than the various embodiments of the subject innovation. The relationship between the energy level structure and crystal field is given by the well known Tanabe-Sugano diagram for octahedral coordination, shown in FIG. 3. The mechanisms of thermal quenching of $Cr^{3+}$ luminescence proceed through two stages, both of which are governed by the spacing of the energy levels of the $Cr^{3+}$ $3d^3$ electron configuration. After excitation by absorption from the $^4A_2$ ground state to either the $^4T_2$ to $^4T_1$ electron configuration levels, fast nonradiative decay occurs to either the $^4T_2$ or $^2E$ level, whichever is lower, wherein the $^2E$ level will be lower for all the high crystal field materials described herein. From there, radiative transitions from the $^2E$ level occurs via the zero-phonon transition back to the $^4A_2$ ground state, producing the luminescence emission conventionally used for temperature (or pressure) sensing. The relative positions of the $^4T_2$ and $^2E$ levels depend on the strength of the crystal field at the site occupied by $Cr^{3+}$. In all the oxide materials discussed herein, the $Cr^{3+}$ dopant (or isoelectronic $3d^3$ transition metal ion) preferentially occupies an octahedral position where it has six oxygen nearest neighbors. The $^4T_2$ energy level increases in energy with crystal field strength while the $^2E$ level stays relatively unchanged; there is a crossover when the crystal field parameter combination Dq/B is 2.3 (where Dq is the ligand field splitting parameter and B is the Racah parameter), above which the $^4T_2$ level is above the $^2E$ level with the energy separation between the levels, $\Delta E$, increasing with increasing crystal field. In the first stage of temperature sensitivity, the sensitivity of luminescence to temperature is associated with thermal promotion from the $^2E$ level, which decays very slowly to the ground state, to the $^4T_2$ level, which undergoes more rapid spin-allowed broadband radiative decay to the $^4A_2$ ground state, as thermal equilibrium is maintained between the $^4T_2$ and $^2E$ level populations. The radiative decay from the $^4T_2$ to $^4A_2$ level produces a spin-allowed broadband luminescence emission (in contrast to the narrow band $^2E$ to $^4A_2$ transition) due to the significant equilibrium position Franck-Condon offset, $\Delta_{FC}$, between the $^4T_2$ and $^4A_2$ electronic-vibratonal energy level parabolas, as indicated on a single configuration coordinate diagram (shown in FIG. 4). The significant offset $\Delta_{FC}$ between the $^4T_2$ and $^4A_2$ levels produces a strongly phonon-coupled (and therefore broadened) radiative transition compared to the transition between the $^2E$ and $^4A_2$ levels, which in contrast have a negligible $\Delta_{FC}$ offset and therefore negligible phonon-coupled broadening. One of the key features of the innovation described herein is the unconventional utilization of the spin-allowed broadband $^4T_2$ to $^4A_2$ radiative emission that usually exhibits thermal quenching at relatively low temperatures, but by the strategic selection of dopant/host material described herein exhibits remarkably long-lived emission at high temperatures due to thermal repopulation from the underlying metastable $^2E$ level. As temperature increases, a higher fraction of the metastable $^2E$ population is thermally promoted to $^4T_2$, over an energy barrier equal to the gap, $\Delta E$, between $^2E$ and $^4T_2$ (see FIGS. 3 and 4). Therefore, for high temperature luminescence, it is desirable for the energy gap, $\Delta E$, between the $^4T_2$ level and the lower-lying $^2E$ level, and thus for the crystal field at the $Cr^{3+}$ site, to be as large as possible.

Assuming the crystal field is strong enough to exceed the $^4T_2$-$^2E$ crossover at $Dq/B=2.3$, luminescence emission at room temperature from a material will be due to the energetically favored transition from the $^2E$ excited state to the $^4A_2$ ground state, producing sharp R-line luminescence. As the temperature increases, the first stage of thermal quenching will occur as maintainenance of thermal equilibrium populates the shorter-lived $^4T_2$ level at the expense of depopulation of the underlying metastable $^2E$ level, but with no loss in radiative efficiency. With increasing temperature, a higher fraction of the emission will be from the higher-lying, shorter-lived $^4T_2$ level and therefore the decay time will decrease in a predictable fashion based on the relative thermal population of these levels.

Figure 4:
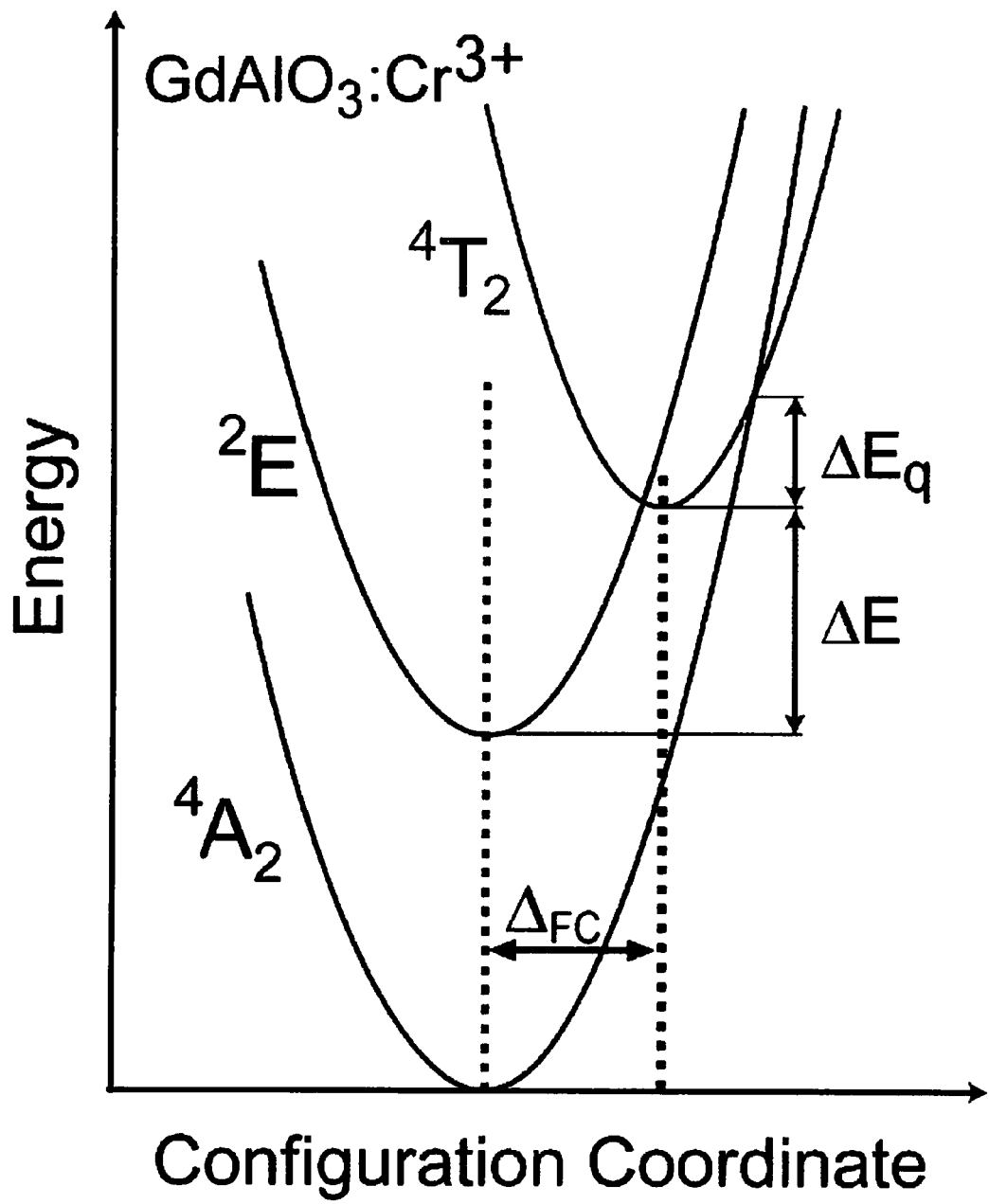
FIG. 4 shows a configuration coordinate diagram for Cr:GdAlO$_3$.

Because thermal equilibration between these states is reached very quickly, the sharp R-line luminescence will exhibit the same temperature dependence of its decay time as the luminescence associated with transitions from the $^4T_2$ state. Because the $^4T_2$ level involves different electron orbitals than the $^2E$ or $^4A_2$ levels (in particular, orbitals along the directions of bonds to the neighboring oxygen atoms), the transition to the ground state is spin allowed and can be easily phonon-assisted so that the transition from the $^4T_2$ state results in a broad emission band and substantially higher radiative rate than the transition from the $^2E$ level. An added driver to the increased population of the $^4T_2$ level is that increasing the temperature will expand the lattice and decrease the crystal field, thereby, reducing the energy separation, $\Delta E$, between the $^2E$ and $^4T_2$ levels. Therefore, in this first stage of thermal quenching, as the temperature increases, there will be an appearance and growth of spin-allowed broadband emission from the $^4T_2$ level at the expense of R-line emission from the $^2E$ level, and the R-line emission will exhibit faster decay due to mixing with the $^4T_2$ level in thermal equilibrium. As the temperature increases further, a second phase of thermal quenching occurs where there is increasing competition from non-radiative transitions, further decreasing the decay time of the luminescence emission. Since the $^4T_2$ level involves different electron orbitals than the $^2E$ and $^4A_2$ levels, it will have a parabolic shape on a single configuration coordinate diagram that is displaced to a new equilibrium position by the offset $\Delta_{FC}$, as shown in FIG. 4, and therefore have a pathway via a nonradiative crossover to the $^4A_2$ level with an energy barrier of $\Delta E_q$ that will be enhanced with the higher phonon occupation at higher temperatures. This cross-over will decrease the radiative efficiency of the decay as a greater fraction of the decays proceed by this nonradiative transition. The energy barrier to this nonradiative crossover decay, $\Delta E_q$, depends on the steepness of the parabola of the $^4T_2$ level on the single configuration coordinate diagram, where this steepness represents the restoring force acting on a displaced atom, which in turn depends on the bonding strength with the neighboring oxygen ions and therefore is sensitive to the crystal field strength; the restoring force parabola will be steeper, and therefore the energy barrier to nonradiative cross-over decay, $\Delta E_q$, will greater, for higher crystal field strengths.

Figure 3:
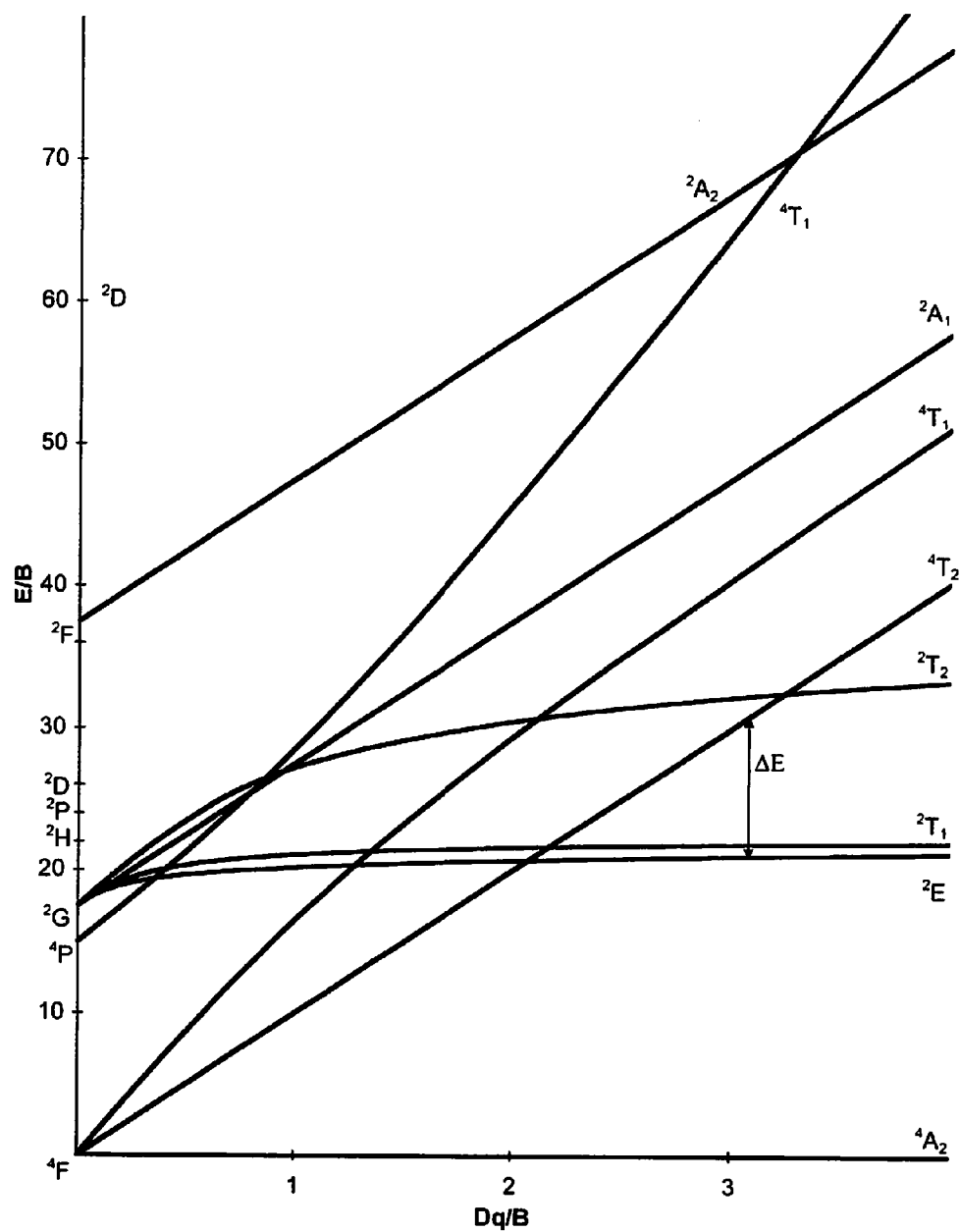
FIG. 3 shows a Tanabe-Sugano diagram for octahedral coordination, illustrating the relationship between the energy level structure and crystal field.

The desirable suppression of thermal quenching responsible for the high temperature sensing capability of the sensor material of the subject innovation (e.g., $Cr:GdAlO_3$ and other orthorhombic perovskite rare earth aluminates doped with transition metals) is based on the high crystal field expected for the transition metal dopant (e.g., $Cr^{3+}$) in this crystalline material, such that this high crystal field will suppress thermal quenching in both stages described above, due to the higher values of both $\Delta E$ and $\Delta Eq$, as seen in FIG. 4. For example, in $GdAlO_3$, based on the known average Al—O spacing of 0.1855 nm in $GdAlO_3$ and 0.1915 nm for ruby, the dependence of crystal field on the inverse fifth power of the interatomic distance can be used to predict a 17% stronger crystal field in $GdAlO_3$ compared to ruby. This is in good agreement with the measured 20% stronger crystal field. As shown in FIG. 3, a 20% stronger crystal field will produce a corresponding greater $\Delta E$ at room temperature. Another advantage of the host material (e.g., $GdAlO_3$, etc.) of the sensors of the subject innovation is its orthorhombic perovskite structure. The orthorhombic structure produces not only strong $AlO_6$ octahedral bonding, but also distortions from cubic symmetry that are necessary to relax the transition rules and allow a large absorption cross-section.

Therefore, stage 1 thermal quenching will be further suppressed in $Cr:GdAlO_3$ compared to ruby, because at the same temperature, the larger $\Delta E$ will result in a much smaller fractional thermal population of the higher $^4T_2$ level at the same temperature. However, at temperatures above 1000° C., stage 2 quenching will be active and R-line luminescence will not be available for temperature sensing. At these higher temperatures, a novel feature of the innovation described herein is that in this high temperature range, the spin-allowed broadband emission from the $^4T_2$ state is used for temperature sensing instead of the usual R-line luminescence. Therefore, one benefit of the selection of the various host materials of the subject innovation (e.g., $GdAlO_3$, etc.) is that the energy bather for the nonradiative crossover relaxation from the $^4T_2$ level to the $^4A_2$ ground state, $\Delta Eq$, is greater for the materials of the subject innovation (e.g., $GdAlO_3$, etc.) than for ruby due to the more tightly bound $AlO_6$ octahedra within $GdAlO_3$ and other materials discussed herein, as compared to ruby. The result is a significantly lower rate of the nonradiative decay by this mechanism, and therefore, the spin-allowed broadband radiative transitions of $^4T_2$ to ground remain strong to significantly higher temperatures.

All of the rare-earths can form perovskite structures of the formula $REAlO_3$ (where RE is a rare earth), but several factors make certain rare earth aluminates preferred for certain applications over others. First of all, depending on the application, not all the rare earth perovskites have the orthorhombic structure over the relevant temperature range. At room temperature, only $REAlO_3$ where RE is Tm, Er, Ho, Y, Dy, Tb, Gd, Eu, and Sm have the orthorhomic perovskite structure— the others have either rhombohedral or cubic perovskite structure, which exhibit undistorted cubic symmetry for the $AlO_6$ octahedra and therefore small absorption cross-sections. Among the rare earth perovskites that have the orthorhombic perovskite structure at room temperature, $SmAlO_3$ transforms to rhombohedral perovskite at about 800° C. and $EuAlO_3$ does the same at about 1000° C. and therefore are not useful for applications requiring higher temperatures. $GdAlO_3$ transforms at about 1700° C. and the others remain orthorhombic up to their melting points. Among the remaining candidates, $GdAlO_3$ has the shortest AlO bonds and therefore the highest crystal field, and therefore exhibits the greatest suppression of thermal quenching of luminescence. The crystal field at the Al octahedral sites (where Cr or another transition metal substitutes) is expected to decrease in the order from largest to smallest ionic radii (Gd>Tb>Dy>Y>Ho>Er>Tm), which should correspond to the order of greatest to least suppression of thermal quenching of luminescence. Therefore, Cr:GdAlO$_3$ is expected to exhibit temperature sensing luminescence to a higher temperature than the other candidates. However, when some sacrifice of the upper temperature limit can be made, stronger luminescence could be produced in the reverse order due to the stronger distortion of the AlO$_6$ octahedra in the reverse order. Thus, Cr-doped (or with other transition metal doping) TbAlO$_3$, DyAlO$_3$, or YAlO$_3$, etc., for example, might be more useful when more intense spin-allowed broadband luminescence is desired and a lower upper temperature limit is acceptable.

In view of the aspects and features described, methodologies that may be implemented in accordance with embodiments of the subject innovation will be better appreciated with reference to the figures. While for purposes of simplicity of explanation, the methodologies are shown and described as a series of drawings representing steps or acts associated with the methodologies, it is to be understood and appreciated that the claimed subject matter is not limited by the order of the drawings, as some drawings may occur concurrently with other drawings and/or in different orders than what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated drawings may be required to implement the methodologies described hereinafter.

Figure 5:
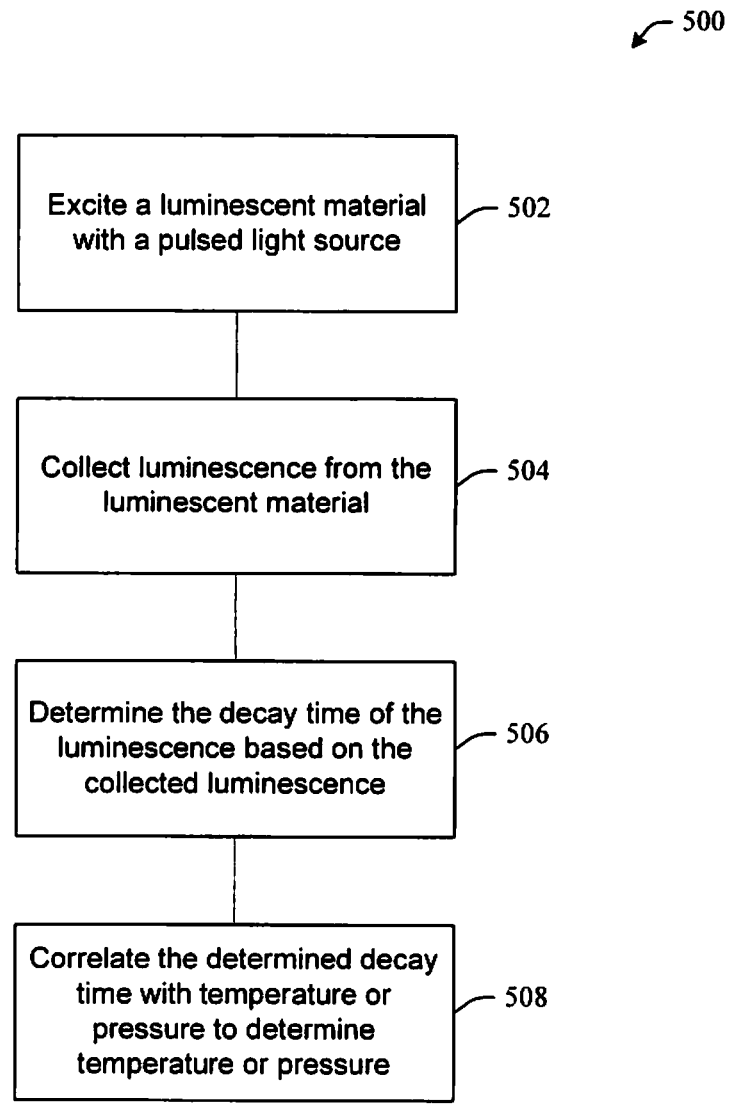
FIG. 5 illustrates a method of optical measurement of temperature or pressure in accordance with aspects of the subject innovation.

In accordance with aspects of the subject innovation, FIG. 5 illustrates a method 500 of optical measurement of temperature or pressure. In step 502, a pulsed light source can provide excitation of the luminescence by illuminating a target material among the materials discussed herein, such as an orthorhombic perovskite rare earth aluminate doped with a transition metal such as chromium (e.g., Cr:GdAlO$_3$, etc.), and optionally doped with an additional rare earth element. In some embodiments, the excitation can be provided by a pulsed laser, but in other embodiments an LED or other source can be used. Note that due to the broad absorption and emission bands for materials discussed herein (e.g., Cr:GdAlO$_3$, etc.), there is considerable flexibility in the choice of excitation wavelength and emission wavelength detection band. At step 504, the luminescence can be collected, such as by measurement component 110, a gated photosensitive system such as an intensified charge-coupled device (ICCD), photomultiplier, etc. In aspects, this luminescence can be spin-allowed broadband luminescence, from which high temperature measurements can be determined, or can correspond to one or more peaks (e.g., a zero phonon peak, an anti-Stokes peak, etc.) of a luminescence spectrum from which lower temperatures can be accurately determined. As discussed herein, collection of the luminescence data can determine a single value for the sensor, or can determine luminescence values of different regions of the sensor (e.g., in embodiments involving coatings, sensors on or in components, dusts or powders introduced, etc.), which can later be used to determine a temperature (or pressure, etc.) map of the surface of the sensor. For components for which temperature (or pressure, or both) values are to be determined on multiple surfaces that cannot be illuminated or imaged from a single location, at least one of multiple light sources or multiple photosensitive systems (or measurement components, etc.) can be used.

In step 506, the decay time of the luminescence can be determined, based on data related to the intensity as a function of time. For luminescence data corresponding to more than one region of a sensor, decay times can be computed for each region. The collected luminescence data can be analyzed by analysis component 112, or substantially any means for processing the data to determine the decay time based on the collected luminescence data, as would be known to a person of skill in the art in light of the subject disclosure. Finally, in step 508, the decay time can be correlated with temperature (or pressure, or both). The temperature (or pressure) can be determined by conventional decay time analysis such as has been developed for other luminescence-based temperature sensors. As a non-limiting example, the determination can comprise fitting a single exponential decay function to a decay trace stored on an oscilloscope, data captured by measurement component 110, etc. by a least squares algorithm and comparing the lifetime value of the function to a series of calibration values correlating decay lifetime to temperature when measured under controlled conditions. For embodiments involving decay times computed for more than one region of a sensor, temperatures (or pressures, or both) can be computed for each of the regions, and a temperature (or pressure, or both) map can be constructed, such as a 2D map of the surface of the sensor, or a 3D map corresponding to a curved surface, etc.

What follows is a more detailed discussion of certain systems, methods, and apparatuses associated with aspects of the subject innovation. To aid in the understanding of aspects of the subject innovation, theoretical analysis and experimental results associated with specific experiments that were conducted are discussed herein. However, although for the purposes of obtaining the results discussed herein, specific choices were made as to the selection of various aspects of the experiments and associated setups—such as the choice of Cr:GdAlO$_3$ as a thermographic phosphor, as well as other aspects—the systems and methods described herein can be employed in other contexts as well. For example, aspects of the subject innovation can be utilized to determine temperature, pressure, or in some embodiments, both temperature and pressure, although the experiments discussed below only discuss determination of temperature. In another example, different selections of materials, excitation sources or wavelengths, photosensitive devices, doping, other than those used in the experiments discussed herein, and may have differing characteristics, as explained in greater detail below.

In experiments conducted herein, intensity data was collected based on excitation of Cr:GdAlO$_3$ at various temperatures, and decay times and temperatures were calculated based on the intensity data obtained. However, other materials could be used instead, although specific results would vary, as would be understood. For most of the results obtained, a 532 nm laser was used to excite luminescence.

Figure 6:
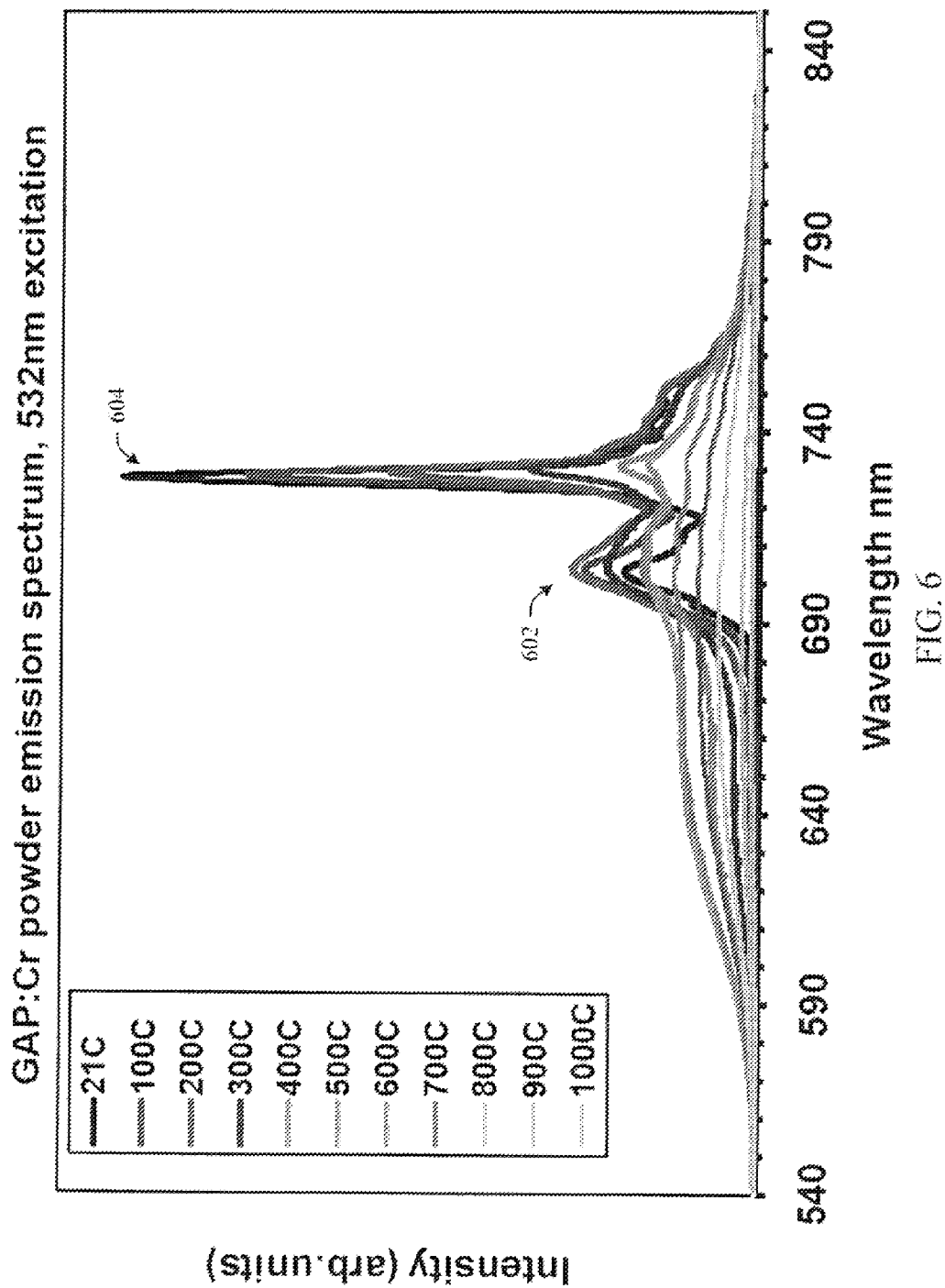
FIG. 6 shows a plot of total intensity collected over time against wavelength for a variety of temperatures based on excitation of Cr:GdAlO$_3$ at 532 nm.
Figure 7:
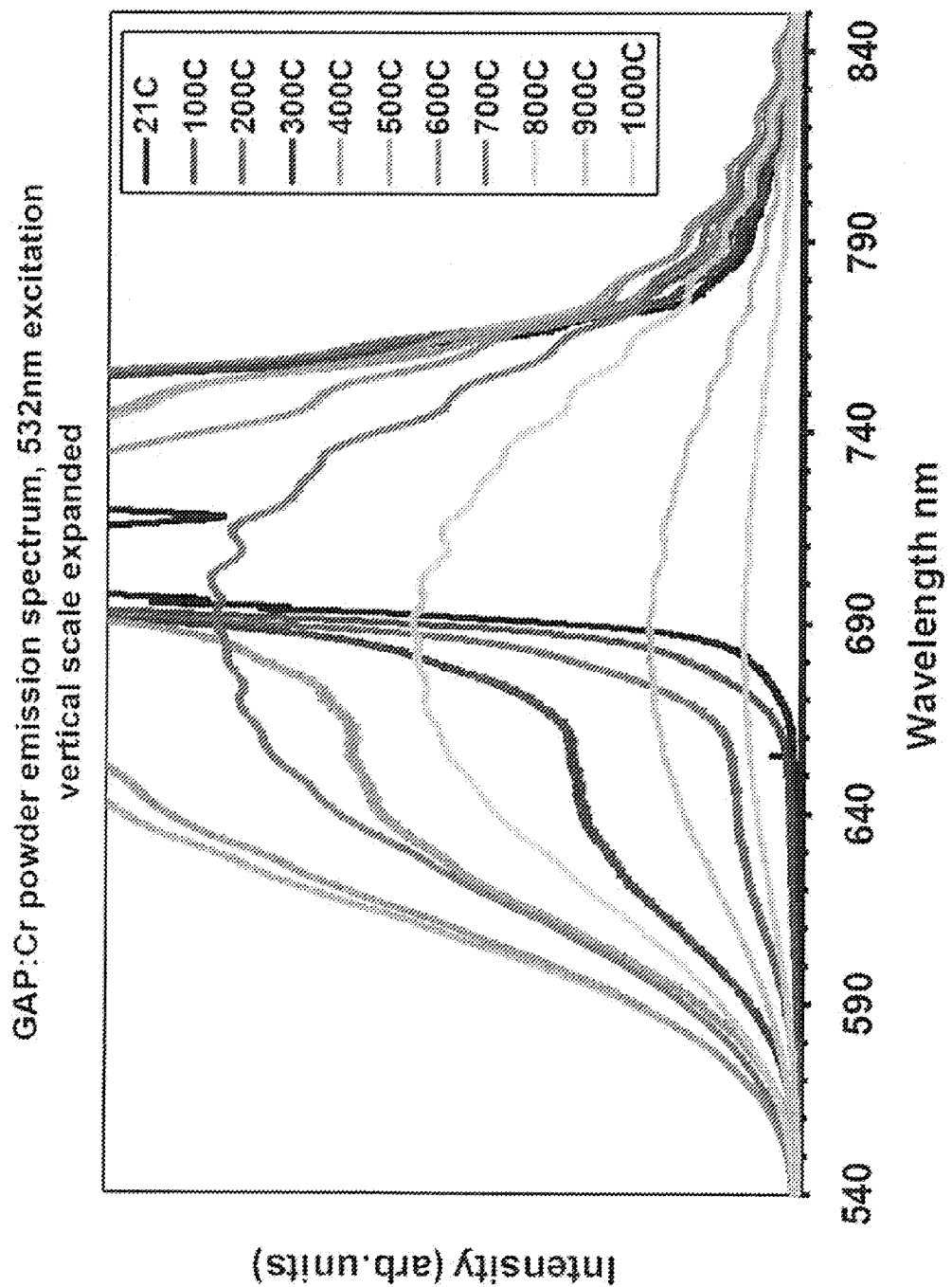
FIG. 7 shows a portion of the same data shown in FIG. 6, with the vertical scale expanded.

FIG. 6 shows a plot of total intensity collected over time against wavelength for a variety of temperatures based on excitation of Cr:GdAlO$_3$ at 532 nm, and FIG. 7 shows a portion of the same data shown in FIG. 6, with the vertical scale expanded. Peaks 602 and 604 represent the anti-Stokes and zero phonon (R-line) peaks of the emission spectrum at about 730 and 700 nm, respectively; these peaks are present at lower temperatures before the thermal population of the $^4T_2$ level increases significantly. Although conventional methods have included determining temperature via R-line luminescence decay (e.g., with ruby), this method is temperature limited, as explained elsewhere. With the materials discussed herein, however, the intensity of spin-allowed broadband luminescence is sufficient that broadband luminescence can be used for temperature measurement up to at least 1300° C. Additionally, in aspects, precise low temperature measurements can be made based on the ratios of peaks 602 and 604, thereby extending the temperature sensing range of the materials described herein to well below the lower temperature limit of luminescence decay and can be utilized all the way down to cryogenic temperatures. As can be seen in FIG. 6, broadband luminescence can be measured at any of a variety of wavelengths, for example wavelengths between around 550 nm to around 850 nm.

Further, the spin-allowed broadband peak intensity remains very high at temperatures up to 1300° C. The decrease in the time-integrated intensities that can be seen in FIGS. 6 and 7 is largely due to decreases in the decay time as temperature increases and does not reflect a similar magnitude decrease in the initial post-laser-pulse luminescence intensity.

Figure 8:
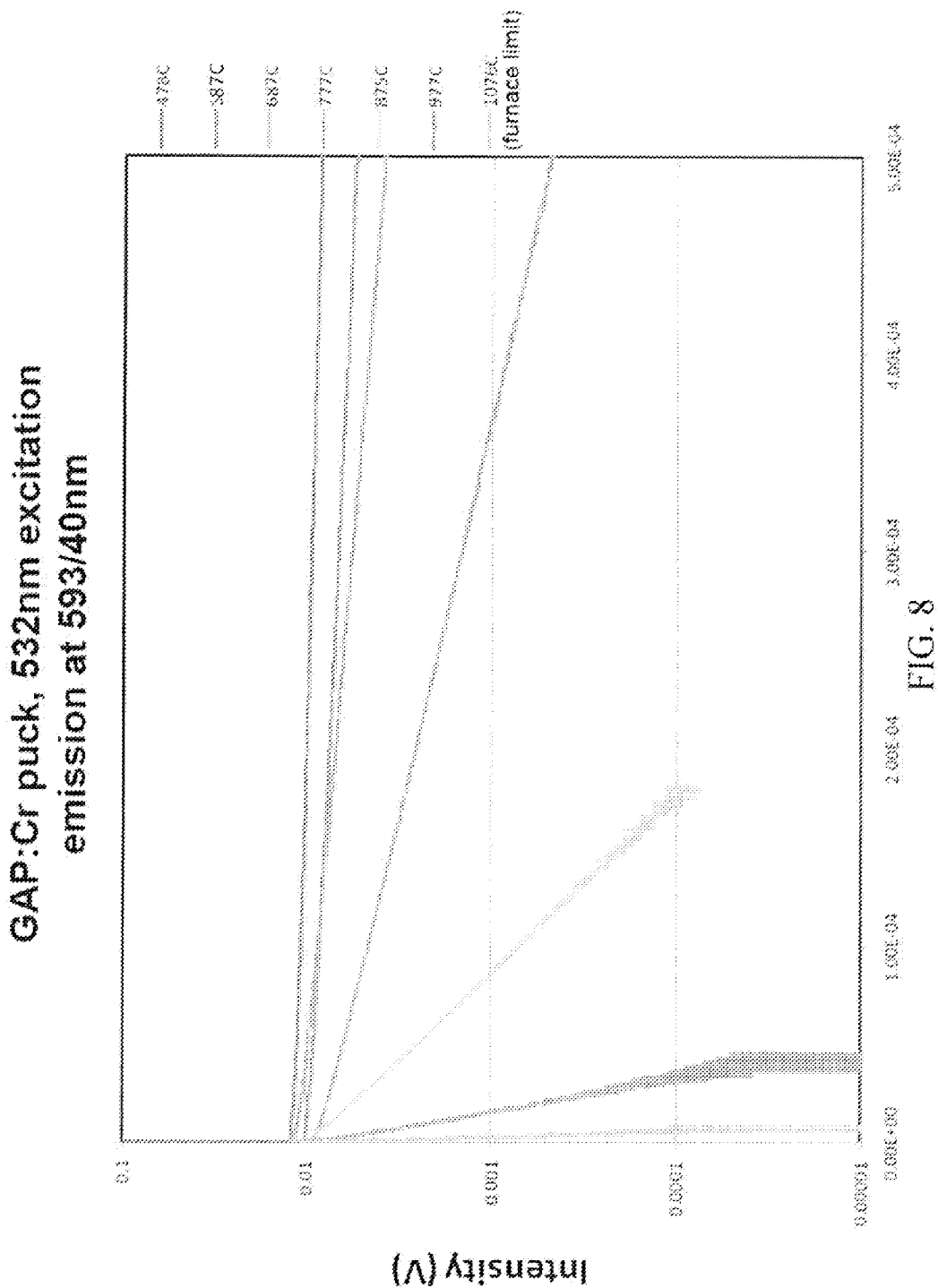
FIG. 8 shows a plot of the logarithm of the intensity against time for luminescence of Cr:GdAlO$_3$ at a variety of temperatures.

FIG. 8 shows a plot of the intensity on a logarithmic scale against time for luminescence of Cr:GdAlO$_3$ at a variety of temperatures. As can be seen from FIG. 8, the intensity undergoes characteristic exponential decay (appears linear on a semilog plot), and the decay time (slope) decreases with increasing temperature. To obtain the results shown in FIG. 8, excitation occurred at 532 nm, and a bandpass filter was used with the photomultiplier tube, with the filter centered around 593 nm, and having a full width at half maximum (FWHM) of 40 nm.

Figure 9:
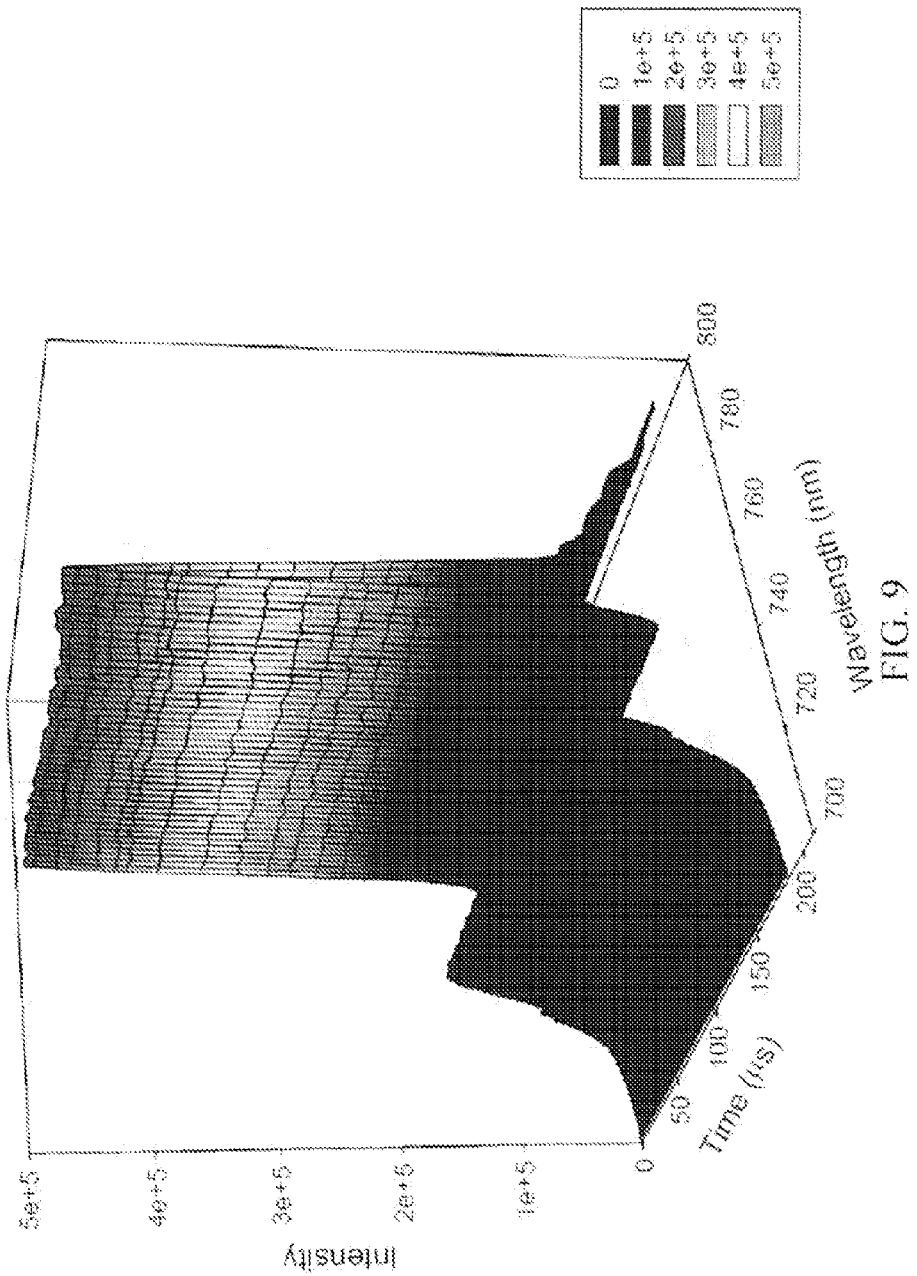
FIG. 9 shows a graph of the intensity as a function of wavelength and time for a Cr:GdAlO$_3$ sample at 24° C.
Figure 10:
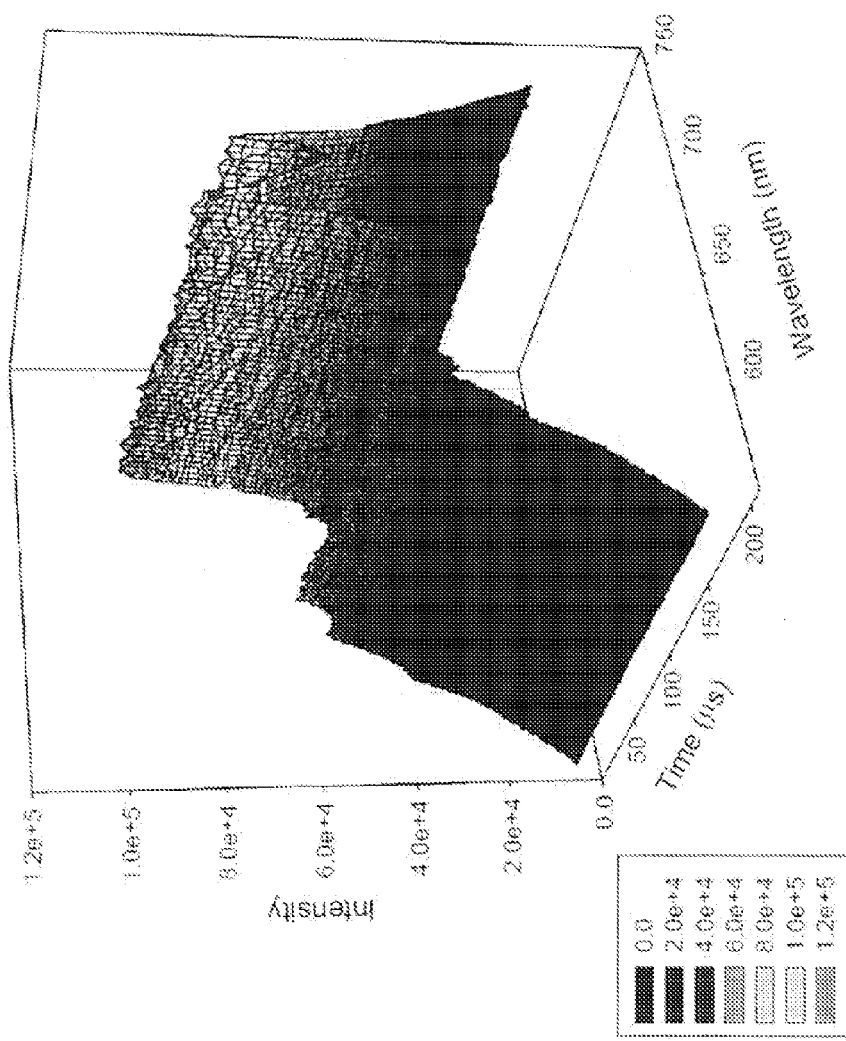
FIG. 10 shows a graph of the intensity as a function of wavelength and time for a Cr:GdAlO$_3$ sample at 399° C.
Figure 11:
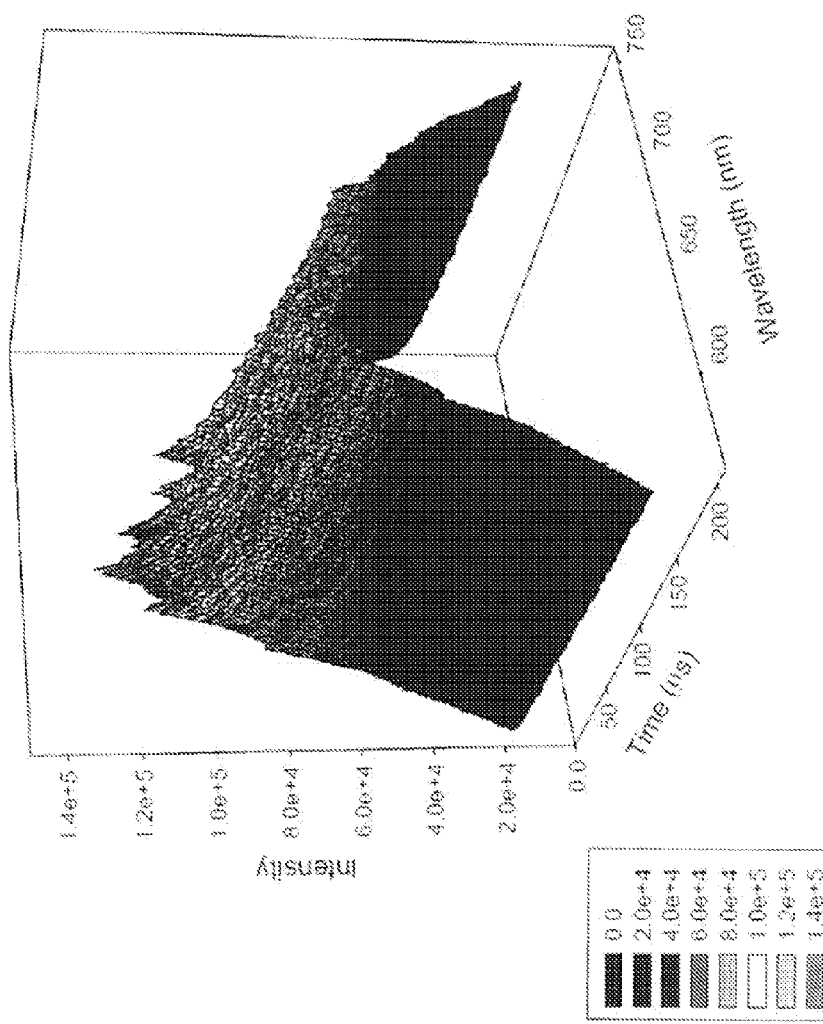
FIG. 11 shows a graph of the intensity as a function of wavelength and time for a Cr:GdAlO$_3$ sample at 599° C.
Figure 12:
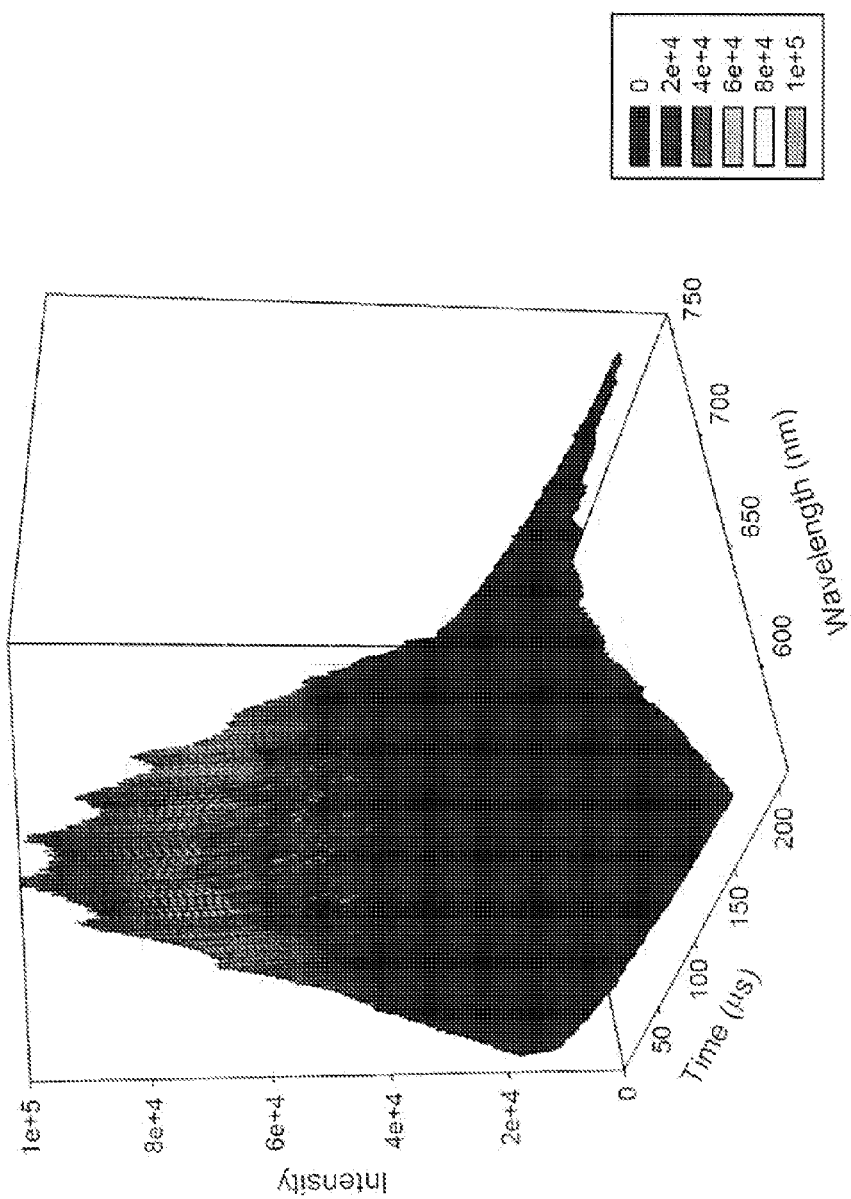
FIG. 12 shows a graph of the intensity as a function of wavelength and time for a Cr:GdAlO$_3$ sample at 799° C.
Figure 13:
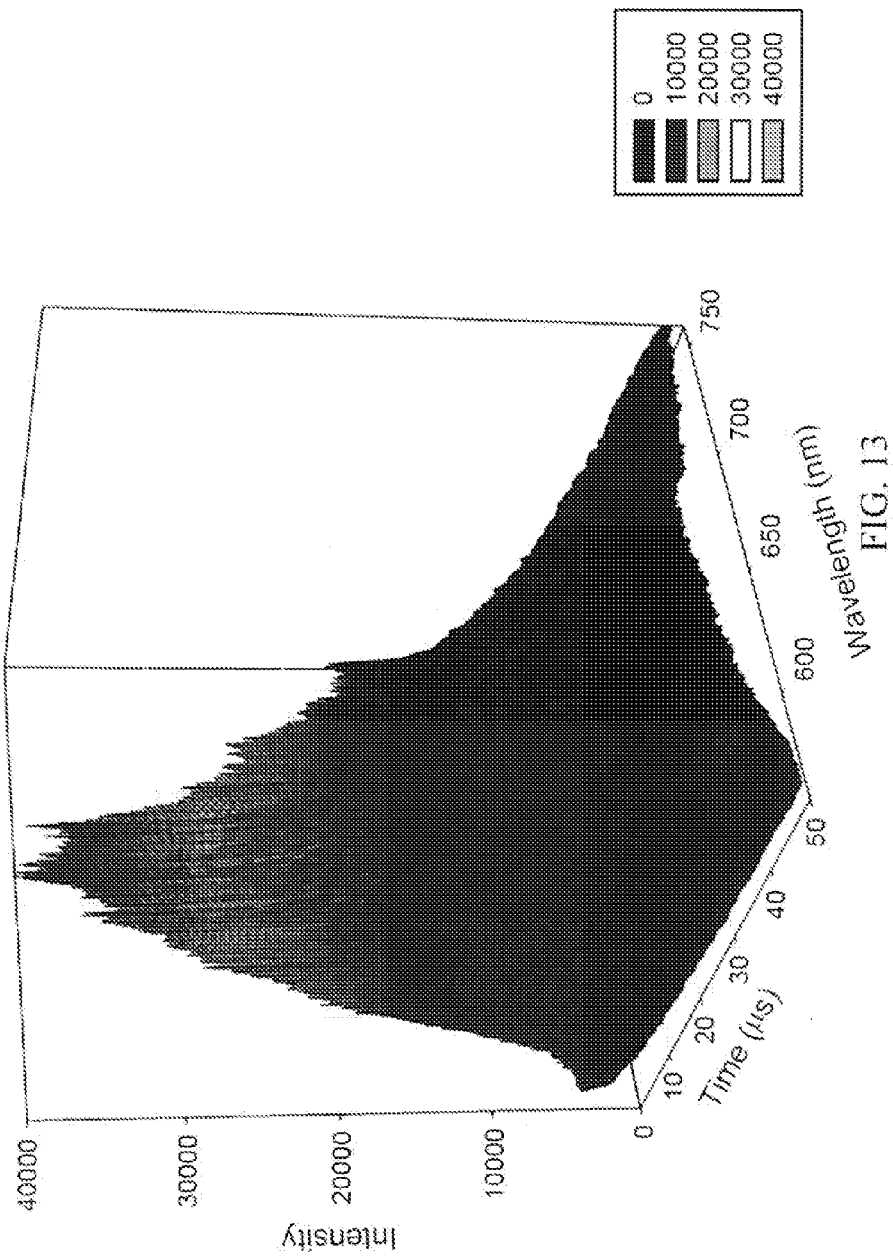
FIG. 13 shows a graph of the intensity as a function of wavelength and time for a Cr:GdAlO$_3$ sample at 999° C.
Figure 14:
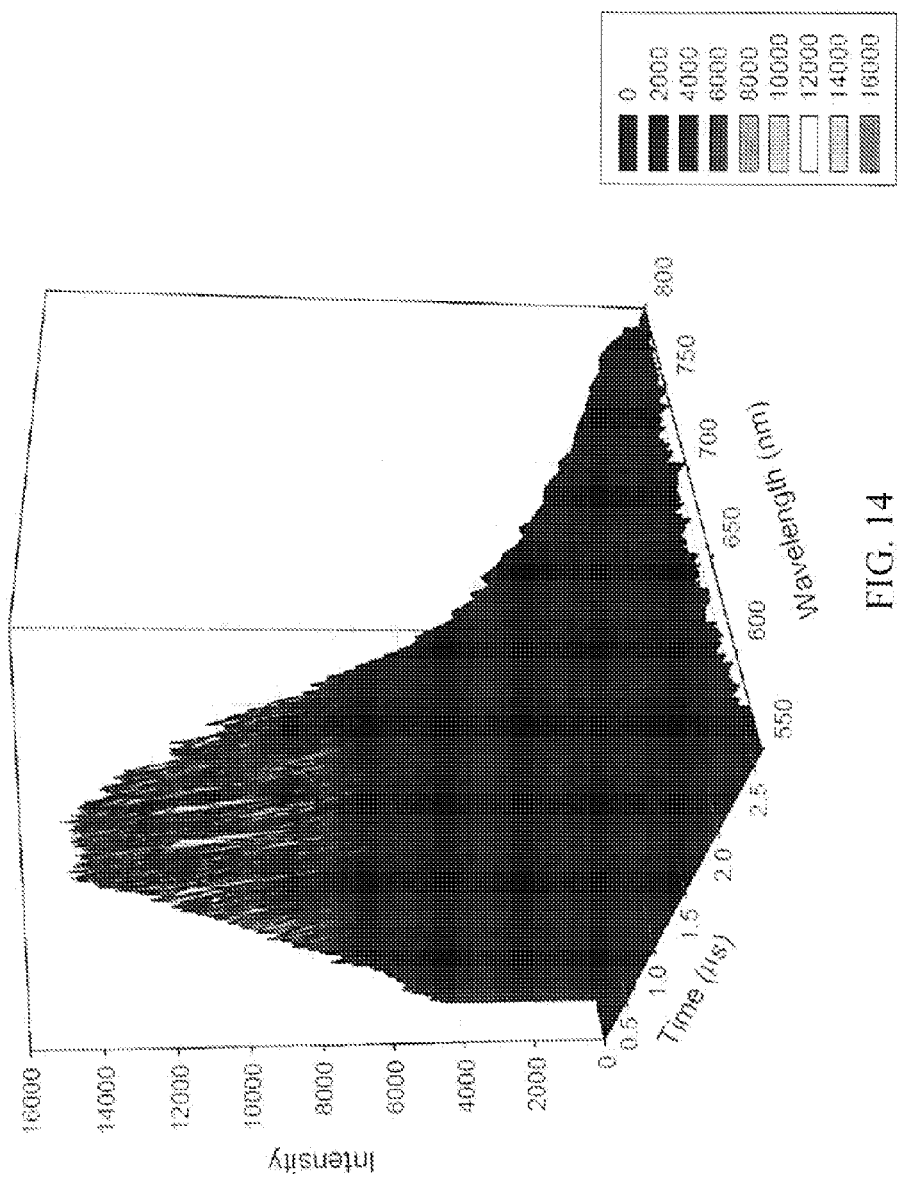
FIG. 14 shows a graph of the intensity as a function of wavelength and time for a Cr:GdAlO$_3$ sample at 1199° C.

FIG. 9 is a graph showing intensity as a function of wavelength and time for a Cr:GdAlO3 sample with 0.2% Cr doping (however, substantially any other doping amounts could be used, for example, less, in a range of around 0.01% or less to around 0.2%, or more), at a temperature of 24° C. As can be seen in FIG. 9, the zero phonon (R-line) and anti-Stokes peaks, at about 730 and 700 nm, respectively, are prominent at room temperature, and there is no significant decay in luminescence signal intensity over the approximately 200 μsec between laser pulses. FIG. 10 shows a graph of the intensity as a function of wavelength and time of the same sample at 399° C., and the zero phonon (R-line) and anti-Stokes peaks are still apparent, although the ratio of the intensity of the anti-Stokes peak to the zero-phonon R-line is much greater than at 24° C. Only a slight decay in luminescence intensity is observed over the 200 μsec time period. FIG. 11 shows a graph of the intensity as a function of wavelength and time of the same sample at 599° C., with the zero phonon and anti-Stokes peaks barely visible. As is apparent from FIGS. 9-11, for Cr:GdAlO$_3$, up to around 600° C. and higher, the non-broadband techniques discussed herein (e.g., involving temperature determinations based on the intensities of at least one of zero phonon or anti-Stokes peaks, etc., including both conventional techniques and novel techniques disclosed herein) can be applied, and can provide accurate measurements of lower temperatures. However, in contrast to conventional systems, the high intensity of the spin-allowed broadband luminescence of the materials discussed herein also allows for substantially higher temperature measurements. FIGS. 12, 13, and 14 show graphs of the intensity as a function of wavelength and time of the same sample at 799° C., 999° C., and 1199° C., respectively. As can be seen from FIGS. 9-14, the decay time decreases sharply while the initial intensity decreases more modestly over the range of temperatures, but decay time remains long enough and initial luminescence intensity remains high enough that accurate measurements can still be conducted beyond the range shown, with the decay time still on the order of 100's of ns at 1199° C., as seen in FIG. 14. To obtain the results of FIGS. 9-14, excitation was done by a 532 nm laser pulsed at a rate of approximately 5 kHz, and intensity data was collected by an intensified charge-coupled device (ICCD) operated in gated mode. FIGS. 12-14 also show qualitatively that the full wavelength range of the spin-allowed broadband luminescence emission decays at a uniform rate so that any emission wavelength region within the broadband emission will produce the same decay times.

Figure 15:
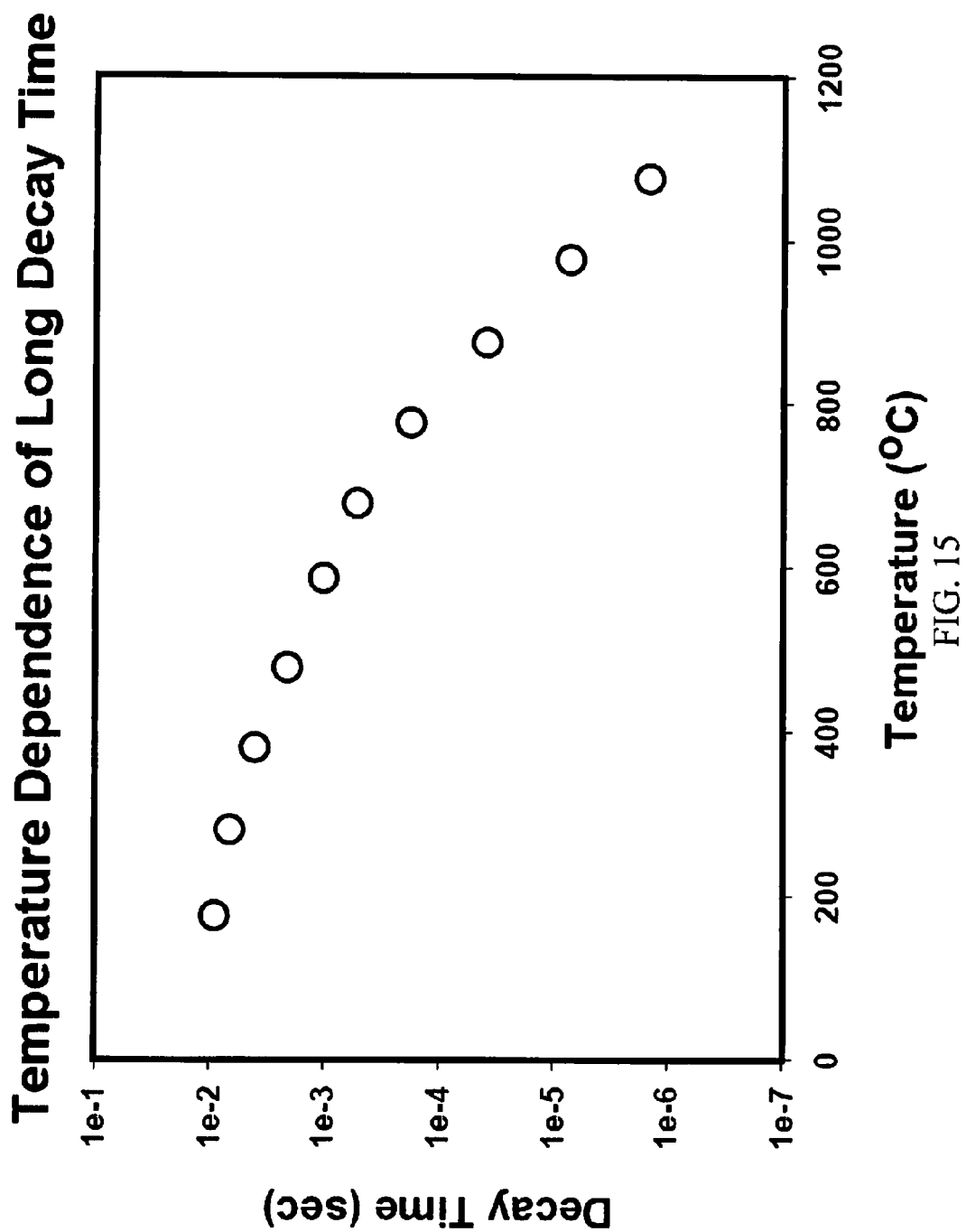
FIG. 15 shows decay time as a function of temperature determined for a Cr:GdAlO$_3$ specimen.

FIG. 15 shows decay time as a function of temperature determined for a Cr:GdAlO$_3$ specimen with 0.2% Cr-doping using techniques discussed herein. As can be seen, even for temperatures of approximately 1100° C., the decay time remains on the order of 1 μs. Also, the many decade decrease in decay time shown in FIG. 15 over the temperature range makes these materials extremely sensitive and accurate temperature sensors.

In embodiments in which the material is to be bonded to a surface, any of multiple techniques can be used to achieve that end. For example, physical vapor deposition (e.g., electron beam, laser ablation, etc.) or sputtering may be used, the material may be mixed with a binding agent (e.g., HPC, Thinning Liquid #14, etc.) and potentially other materials and applied to a surface and cured, etc. Material parameters may be varied, such as layer thickness, particle size, placement within a coating (e.g., TBC, etc.) (although depending on placement, intensity may be attenuated too much by placing the material in too low of a layer), etc.

Systems and methods of the subject innovation allow for an enormous range of commercial applications, such as by opening up new applications for the much wider high temperature range of non-contact temperature sensing operation. For example, many chemical and material processing applications, such as metal-forming and glass making to name a few, need non-contact temperature sensing at these higher temperatures that can operate with high thermal radiation backgrounds present. Turbine engine environments for aeronautics or power plants are another example application for these higher temperature non-contact temperature sensors, and may also be an application where simultaneous measurements of temperature and pressure may be beneficial. Military and aerospace applications that tend to push the envelope for high temperature performance (e.g., missiles, ballistics, rocket technology, etc.) are also an area where these new sensing materials that are immune to electromagnetic interference could fill a critical need. Sensors in accordance with the subject innovation are useful in a variety of settings, as GdAlO$_3$ and other similar materials used in aspects of the subject innovation are non-reactive and stable in harsh, high-temperature environments. Combined pressure and temperature sensors, such as RE,Cr:GdAlO$_3$ and other similar materials, can be useful in environments where both high pressures and temperatures may be encountered, such as inside engines (e.g., aerospace, internal combustion, etc.), etc. Depending on the application, one or more embodiments of the subject innovation may be appropriate.

Additionally, numerous other applications exist, as the systems and methods described herein can be used to measure temperature, pressure, or both in a wide variety of settings. Thus, systems and methods in accordance with the subject innovation can be employed in aerospace, industrial, or testing applications, as well as other scenarios. Additionally, while specific examples and uses of the techniques and systems described herein have been noted, it is to be understood that alternative embodiments exist. These alternatives are to be included within the scope of this specification and claims appended hereto.

In other words, what has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A luminescence-based sensor system, comprising:
   a transition metal-doped rare earth aluminate (M:REAlO$_3$) sensor, wherein the transition metal has an electron configuration that is one of 3d$^3$, 4d$^3$, or 5d$^3$, and wherein the rare earth is one of Gd, Tb, Dy, Y, Ho, Er, or Tm;
   a measurement component that receives luminescence illumination from the M:REAlO$_3$ sensor and measures intensity data associated with the luminescence illumination, wherein the luminescence illumination comprises spin-allowed broadband luminescence; and
   an analysis component that determines at least one of a temperature or a pressure based at least in part on the measured intensity data, wherein the analysis component determines the at least one of the temperature or the pressure based at least in part on a decay time of a spin-allowed broadband portion of the measured intensity data.

2. The system of claim 1, wherein the analysis component determines the at least one of the temperature or the pressure based at least in part on correlation of the decay time with one or more calibration values via regression analysis.

3. The system of claim 1, wherein the measurement component determines intensity data corresponding to a plurality of regions of the sensor, and wherein the analysis component determines a map of at least one of the temperature or the pressure based at least in part on the intensity data corresponding to the plurality of regions of the sensor.

4. The system of claim 1, further comprising an optical excitation source that illuminates the M:REAlO$_3$ sensor at one or more wavelengths of an excitation spectrum of the M:REAlO$_3$ sensor, wherein at least a portion of the excitation spectrum comprises one or more wavelengths between around 350 nm to around 600 nm.

5. The system of claim 4, further comprising a control component that coordinates the intensity data received by the measurement component with pulsed illumination of the M:REAlO$_3$ sensor by the optical excitation source.

6. The system of claim 1, wherein the spin-allowed broadband portion of the measured intensity data comprises one or more wavelengths between around 550 nm to around 850 nm, and wherein the one or more wavelengths are measured based at least in part on optimization of a signal to noise ration or avoidance of spectral interferences.

7. The system of claim 1, wherein the M:REAlO$_3$ sensor is at least one of attached to the end of a fiber optic probe or incorporated into a coating.

8. The system of claim 1, wherein the M:REAlO$_3$ sensor is a chromium-doped gadolinium aluminate (Cr:GdAlO$_3$) sensor.

9. The system of claim 1, wherein the M:REAlO$_3$ sensor is additionally doped with a second rare earth element (RE2) from among any of the lanthanide series rare earth elements different than the rare earth element in the M:REAlO$_3$ sensor to produce a Cr,RE2:REAlO$_3$ sensor, and wherein the analysis component determines both the temperature and the pressure based at least in part on the measured intensity data.

10. The system of claim 1, wherein the M:REAlO$_3$ sensor is incorporated as a dust or powder into a flame, heated exhaust stream, or other similar environment.

11. The system of claim 1, wherein the analysis component determines the at least one of the temperature or the pressure based at least in part on calculating a ratio between a first intensity of a zero phonon peak and a second intensity of an anti-Stokes peak.

12. A method of measuring based on luminescence, comprising:
    exciting a luminescent material with a pulsed light source, wherein the luminescent material is a sensor comprising an orthorhombic perovskite structure of a first rare earth aluminate doped with a nd$^3$ electron configuration transition metal ion, wherein n is one of 3, 4, or 5 (M:REAlO$_3$);
    collecting luminescence from the M:REAlO$_3$ sensor; and
    determining at least one of a temperature or a pressure of the M:REAlO$_3$ sensor based at least in part on the collected luminescence of the M:REAlO$_3$ sensor, wherein determining the at least one of the temperature or the pressure of the M:REAlO$_3$ sensor comprises determining a decay time of spin-allowed broadband luminescence of the M:REAlO$_3$ sensor and correlating the decay time with one or more calibration values.

13. The method of claim 12, wherein the M:REAlO$_3$ sensor comprises gadolinium aluminate doped with chromium (Cr:GdAlO$_3$).

14. The method of claim 12, wherein determining the at least one of the temperature or the pressure of the M:REAlO$_3$ sensor comprises determining a ratio of intensities of a zero phonon peak and an anti-Stokes peak.

15. The method of claim 12, determining at least one of the temperature or the pressure of the M:REAlO$_3$ sensor comprises determining at least one of the temperature or the pressure for multiple regions of the M:REAlO$_3$ sensor and creating a real-time map of the temperature or the pressure of the M:REAlO$_3$ sensor.

16. The method of claim 12, wherein the M:REAlO$_3$ sensor is additionally doped with a second rare earth element distinct from the first rare earth element.

17. The method of claim 12, wherein the sensor is at least one of attached to a fiber optic probe or incorporated into a coating.

18. The system of claim 12, wherein the sensor is incorporated as a dust or powder introduced into at least one of a flame or a fluid.

19. A luminescence-based sensor system, comprising:
    a chromium-doped gadolinium aluminate (Cr:GdAlO$_3$) sensor;
    a measurement component that receives spin-allowed broadband luminescence from the Cr:GdAlO$_3$ sensor and measures intensity data associated with the spin-allowed broadband luminescence; and
    an analysis component that determines at least a temperature based at least in part on the measured intensity data, wherein the analysis component determines the temperature based at least in part on a decay time of the spin-allowed broadband luminescence.

20. The system of claim 19, wherein the Cr:GdAlO$_3$ sensor is additionally doped with a rare earth (RE) element other than gadolinium to produce a Cr,RE:GdAlO$_3$ sensor, and wherein the analysis component determines both the temperature and a pressure based at least in part on the measured intensity data.

* * * * *